United States Patent [19]
Tamura

[11] Patent Number: 5,978,348
[45] Date of Patent: Nov. 2, 1999

[54] OPTICAL RECORDING MEDIUM AND PROCESS FOR PRODUCTION THEREOF

[75] Inventor: Tomoyuki Tamura, Yokohama, Japan

[73] Assignee: Canon Kabushiki Kaisha, Tokyo, Japan

[21] Appl. No.: 08/768,611

[22] Filed: Dec. 18, 1996

[30] Foreign Application Priority Data

Dec. 20, 1995 [JP] Japan ................................. 7-331853

[51] Int. Cl.⁶ ........................................................ G11B 7/24
[52] U.S. Cl. ........................................ 369/275.1; 235/488
[58] Field of Search ................................. 369/275.1, 94, 369/281, 280, 286, 273, 272; 235/454, 488

[56] References Cited

U.S. PATENT DOCUMENTS

| | | | |
|---|---|---|---|
| 4,831,244 | 5/1989 | Slafar et al. | 235/487 |
| 5,119,356 | 6/1992 | Matsuoka et al. | 369/58 |
| 5,248,584 | 9/1993 | Miura et al. | 430/270 |
| 5,297,132 | 3/1994 | Takano et al. | 369/284 |
| 5,410,142 | 4/1995 | Tsuboi et al. | 235/488 |
| 5,432,770 | 7/1995 | Yashima et al. | 369/100 |

FOREIGN PATENT DOCUMENTS

| | | |
|---|---|---|
| 0676715 | 10/1995 | European Pat. Off. . |
| 64-16696 | 1/1989 | Japan . |
| 2-30595 | 1/1990 | Japan . |
| 2-247820 | 10/1990 | Japan . |
| 6-176519 | 6/1994 | Japan . |

OTHER PUBLICATIONS

Patent Abstracts of Japan, vol. 018, No. 516 (P–1806), Sep. 28, 1994, JP, 06–176,219.

Patent Abstracts of Japan, vol. 011, No. 045 (P–546), Feb. 10, 1987 JP, 61–214,151.

Patent Abstracts of Japan, vol. 011, No. 097 (P–560), Mar. 26, 1987 JP, 61–248,231.

*Primary Examiner*—Tan Dinh
*Attorney, Agent, or Firm*—Fitzpatrick, Cella, Harper & Scinto

[57] ABSTRACT

An optical recording medium includes an optical recording layer readable by radiation within a first wavelength band, and first and second visible information layers. The first information region is overlaid by the optical recording layer. An opaque layer is provided between the first and second information layers. The optical recording layer has a transmissivity for visible radiation so that the first visible information is visually readable through the optical recording layer.

52 Claims, 13 Drawing Sheets

PRIOR ART

PRIOR ART

PRIOR ART

PRIOR ART

PRIOR ART

PRIOR ART

5,978,348

OPTICAL RECORDING MEDIUM AND PROCESS FOR PRODUCTION THEREOF

BACKGROUND OF THE INVENTION

1. Field of the invention

This invention relates to an optical recording medium and a process for production thereof.

2. Related Background Art

In recent years, information recording has progressed. Many optical recording media and information recording and/or reproducing apparatuses which record and/or reproduce information optically such as optical discs, optical cards, optical tapes and so on have been proposed. Desirable features of the optical information recording media (hereafter referred to as optical recording media) are high recording density, long lifetime, and a large capacity compared to their size arise because the media can be recorded on and reproduced from without being contacted.

Some portable optical recording media such as optical card type media have been proposed, researched and developed recently. Amongst such media, there is a proposal that visible information, for example character information or picture information such as the distributor's name for the media, the system title, the owner's name and so on is added.

In the past, such added information on the optical recording medium was generally executed on a region other than the region (hereinafter referred to as optical recording region) where the optical recording layer of the optical recording medium was provided.

FIGS. 1 to 6 illustrate prior art recording media, equivalent features in FIGS. 1 to 4 being denoted by corresponding reference numerals.

FIGS. 1 and 2 illustrate an optical recording media including visible information as described in Japanese laid open patent JP-A-64-16696. In FIGS. 1 and 2, FIGS. 1(a) and 2(a) are plan views of an optical card, whilst FIGS. 1(b) and 2(b) are respectively, cross-sections along the lines A—A, and B—B of FIGS. 1(a) and 2(a).

The optical recording media shown in these figures comprise a hard coat layer 101 and a transparent substrate 102 having a preformat pattern 103 comprising prepits and pregrooves. An optical information recording portion 104 is formed on a surface of the substrate having the preformat pattern 103. The card also includes an adhesive layer 105, back substrate 106, and a printed layer 107 including a portion carrying visible information 108.

In the medium shown in FIG. 1, the printed layer 107 including the visible information 108 is formed on the outside surface of the back substrate 106. In the medium shown in FIG. 2, the printed layer 107 is formed on the adhesive layer 105 side of the back substrate 106. In this particular structure, the region for carrying character information or picture information is restricted. Furthermore, there is the problem that this arrangement restricts the design of the optical recording medium. The addition of an IC chip, magnetic stripes, or a photograph of a human face on the optical card was investigated in order to produce an ID card or a machine readable card representing money. In these cases the region on which the visible information can be added becomes very narrow.

FIG. 3a illustrates a plan view and FIG. 3b illustrates a cross-sectional view along the line C—C of the recording medium shown in JP-A-2-30595 of FIG. 3.

In this optical recording medium, an optical recording layer 104 composed of polymethine dye was formed so as to cover the visible information portion which is formed on the back substrate 106. It is then possible to read out the visible information 108 through the recording layer 104.

FIG. 4 illustrates an optical recording medium as disclosed in JP-A-2-247820. FIG. 4(a) is a plan view of the medium, FIG. 4(b) is an enlarged plan view of the optical recording portion of the medium, and FIG. 4(c) is a cross sectional view along line D—D of FIG. 4(a).

In this medium, the visible information portion 108 is formed on the surface of an optical recording medium substrate 411. The optical recording portion 104 is formed on the surface of the visible information portion 108, the surface also carrying a magnetic stripe 401. In this structure it is possible to read out the visible information 108 through the optical recording portion 104.

JP-A-6-176519 discloses two optical cards which are capable of having added enough general information by reading out information stored under the optical recording layer. The structure of these optical cards are explained referring to FIGS. 5 and 6 in which FIGS. 5a and 5b show, respectively, a plan view and cross sectional side view along the line E—E of the first card, and FIG. 6 shows a side view of the second card, the plan view being the same as the first card.

In FIG. 5 the optical card 501 is formed as follows. A surface side printed layer 503, an adhesive layer 504, optical recording medium 505, transparent protective layer 506 are laminated in this order on a card base 507. On the underside of the card base 507, a back side printed layer 508 is formed. The back side printed layer 508 is covered with a transparent back side printed protective layer 509. On the surface side printed layer 503, two sets of barcodes 511A,B including card information indicative of an attribute of the card is formed. The barcodes 511A,B are laminated under the optical recording medium 505. As a transparent medium is used as the optical recording medium 505, the barcodes 511A,B can be read out through the transparent protective layer 506 and optical recording medium 505.

Turning now to FIG. 6, the optical card 501 is formed as follows. The adhesive layer 504, optical recording medium 505, transparent protective layer 506 are formed on a transparent card base 513. On the underside of the card base 513 is a surface side printed layer 503, a back side printed layer 508 and a back side printed protective layer 509 are formed. The barcodes 511A,B are formed on the surface side printed layer 503 so as to be read out through the transparent protective layer 506, the optical recording medium 505, the adhesive layer 504 and the transparent card base 513.

However, all prior art described above is devoid of any disclosure about an optical recording medium capable of including high contrast visible information having no influence on the recording and reproducing characteristics of the optical recording medium.

SUMMARY OF THE INVENTION

An object of this invention is to provide an optical recording medium which may carry a large amount of high grade information readable with radiation other than radiation for reproducing optically recorded information and exhibit a high quality as an optical recording medium.

Another object of this invention is to provide an optical recording medium maintaining high efficiency as an optical recording medium in which it is difficult to fake the information readable with radiation other than radiation for reproducing optically recorded information, carried by the medium.

Another object of this invention is to provide an optical recording medium exhibiting a high quality as an optical recording medium and having difficult to fake information readable with radiation other than radiation for reproducing optically recorded information.

A further object of the present invention is to provide a process for producing an optical recording medium which may carry a large amount of high grade information readable with radiation other than radiation for reproducing optically recorded information.

According to the first aspect of the invention there is provided an optical recording medium comprising: an optical recording layer readable by radiation within a first wavelength band; and a first information region carrying first information, and a second information region carrying second information, said first and second regions being readable by radiation within a second wavelength band different to said first wavelength band, the first information region being overlaid by the optical recording layer, the optical recording layer having a transmissivity for radiation within said second wavelength band so that the first information is readable through the optical recording layer by radiation within said second wavelength band, wherein the medium includes, a layer opaque to radiation within said second wavelength band provided between the first information region and the second information region.

The first and second information may be visible information which is eye-readable.

In a medium in accordance with the first aspect of the present invention, when information recorded in the optical recording layer is reproduced, noise can be prevented in the reproducing signals by providing an opaque layer between the second visible information layer and the first visible information layer. As there is no interference between the first visible information and the second visible information, the optical recording medium can carry much high grade visible information.

According to a second aspect of the present invention there is provided an optical recording medium comprising: an optical recording layer readable by radiation within a first wavelength band; a first information region carrying first information readable by radiation within a second wavelength band different to said first wavelength band, the first information region being overlaid by the optical recording layer, the optical recording layer having a transmissivity for radiation within said second wavelength band so that the first information is readable through the optical recording layer, wherein the surface of the first information region which opposes the optical recording layer is arranged to have a low reflectivity for radiation within said first wavelength band.

Preferably the surface of the first information layer opposing the recording layer has a low reflectivity for the light of the radiation beam's wave length.

In a medium in accordance with the second aspect of the present invention, by providing the information between the transparent substrate and the protective layer it is possible to prevent the information leading to noise in the optical reproducing signals produced by the optical recording layer. As a result it is possible to obtain an optical recording medium carrying information which is readable through the optical recording layer and is difficult to fake, the characteristics of the optical recording medium not being affected by the information.

According to the third aspect of the present invention there is provided a process for production of an optical recording medium comprising, an optical recording layer readable by radiation within a first wavelength band, first and second information regions carrying respectively first and second information readable by radiation within a second wavelength band different to said first wavelength band, the process comprising the steps of: laminating the substrate and the protective layer, with the optical recording layer interposed between the substrate and the protective layer, the substrate being at least partially transmissive to radiation within said first and second wavelength bands and the optical recording layer being at least partially transmissive to radiation within said second wavelength band; providing the first information layer at the surface of the protective layer remote from the optical recording layer, so that the surface of the first information layer carrying the first information opposes the optical recording layer, and so that the first information is overlaid by the optical recording layer, forming an opaque layer over the first information layer; and forming the second information layer over the opaque layer.

BRIEF DESCRIPTION OF THE DRAWINGS

A number of embodiments of the invention will now be described, by way of example only, with reference to the accompanying drawings, in which.

DESCRIPTION OF THE PREFERRED EMBODIMENTS

First Embodiment

Figure 1A:
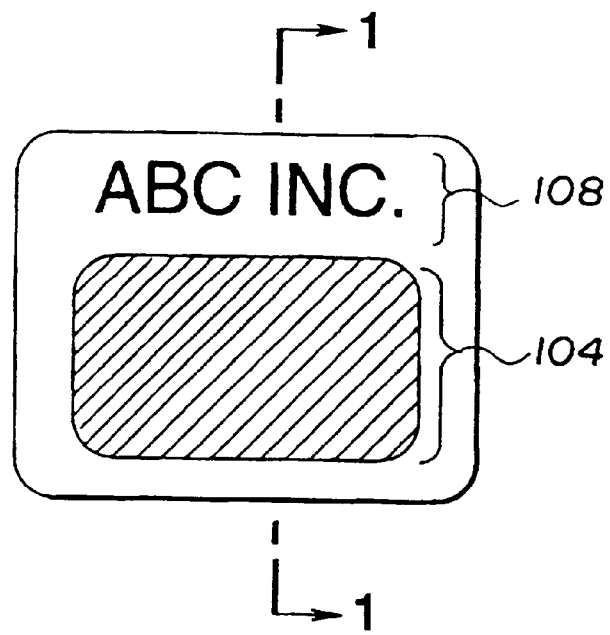
FIG. 1(a) is a schematic plan view of a prior art optical recording medium which has visible information.
Figure 1B:
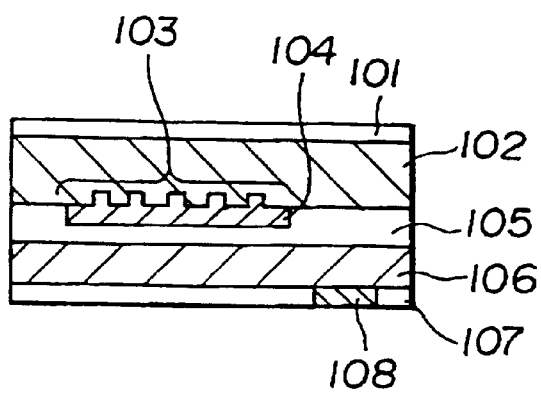
FIG. 1(b) is a schematic cross sectional view taken on line A—A of FIG. 1(a)
Figure 2A:
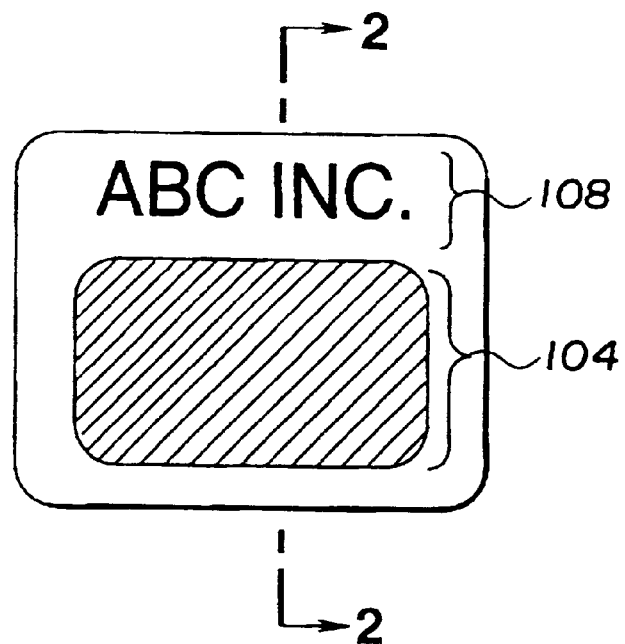
FIG. 2(a) is a schematic plan view of a prior art optical recording medium which has visible information.
Figure 2B:
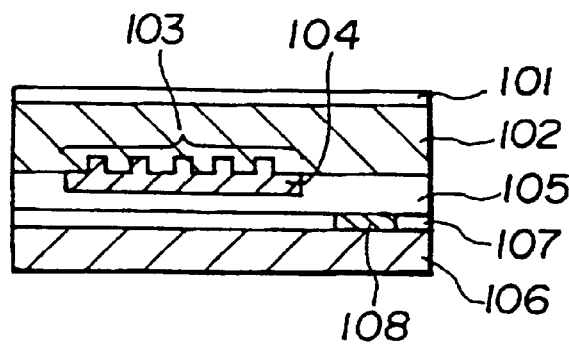
FIG. 2(b) is a schematic cross sectional view taken on line B—B of FIG. 2(a)
Figure 3A:
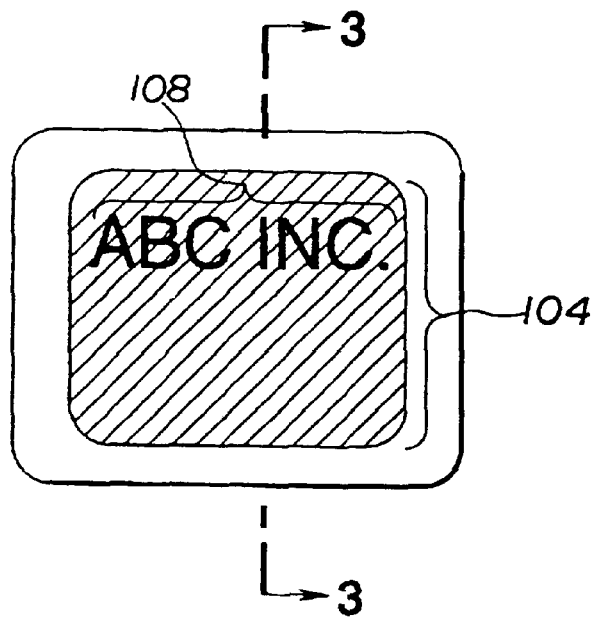
FIG. 3(a) is a schematic plan view of a prior art optical recording medium which has visible information.
Figure 3B:
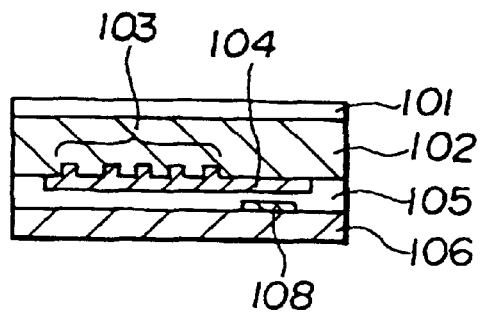
FIG. 3(b) is a schematic cross sectional view taken on line C—C of FIG. 3(a)
Figure 4A:
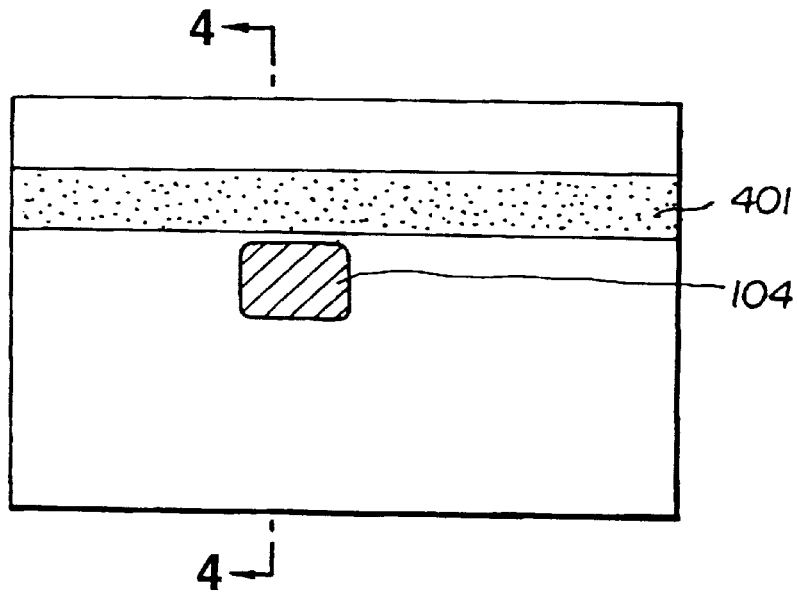
FIG. 4(a) is a schematic plan view of a prior art optical recording medium which has visible information.
Figure 4B:
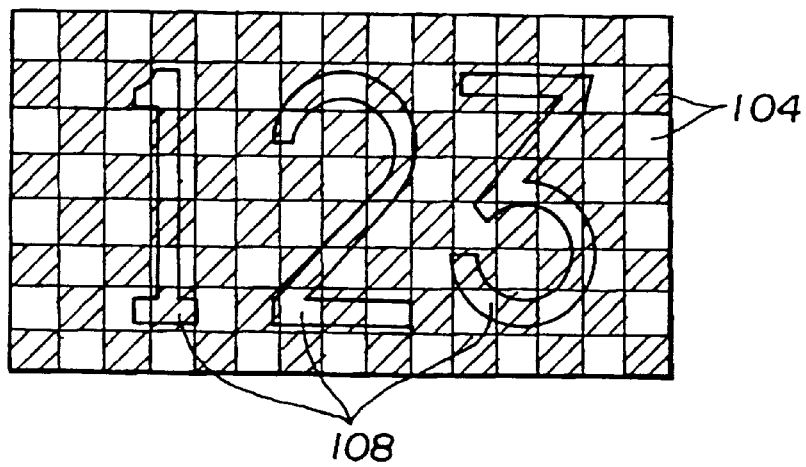
FIG. 4(b) is an enlarged schematic plan view of an optical recording portion of the medium of FIG. 4(a)
Figure 4C:
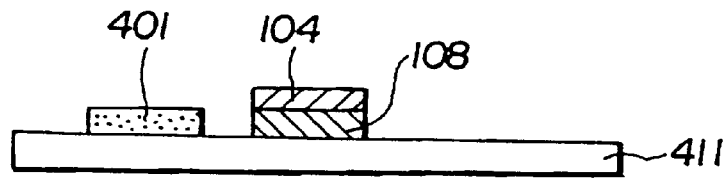
FIG. 4(c) is a schematic cross sectional view taken on line D—D of FIG. 4(a)
Figure 5A:
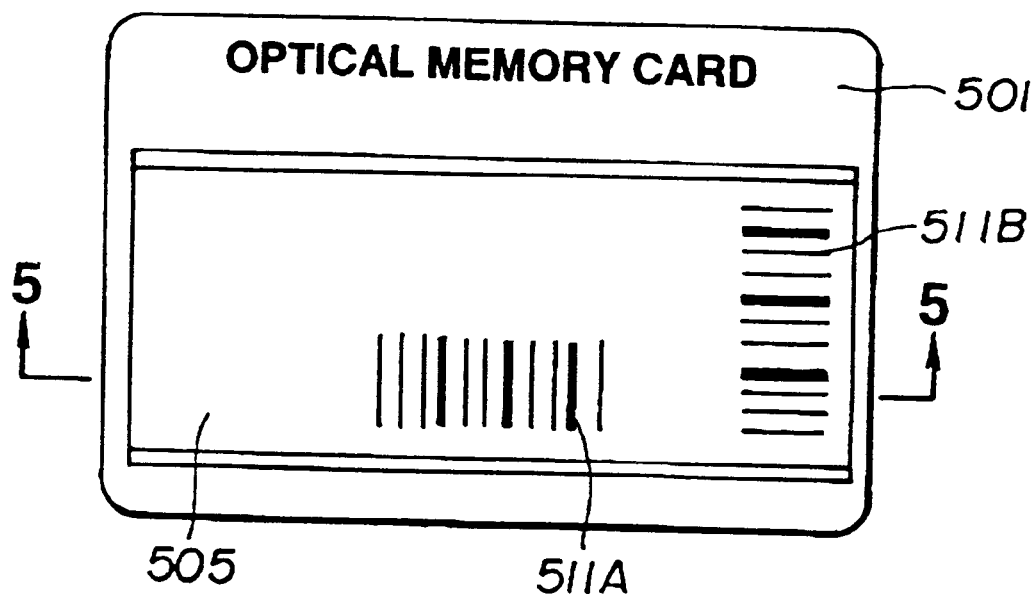
FIG. 5(a) is a schematic plan view of a prior art optical recording medium which includes visible information.
Figure 5B:
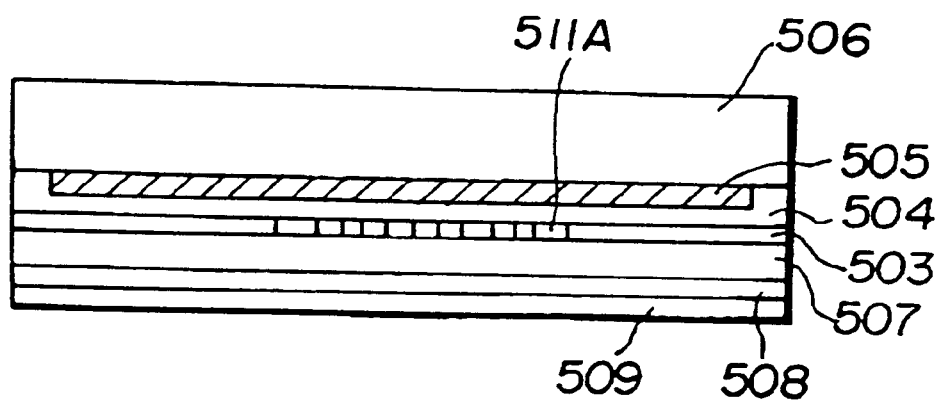
FIG. 5(b) is a schematic cross sectional view of FIG. 5(a) along the line E—E of FIG. 5(a)
Figure 6:
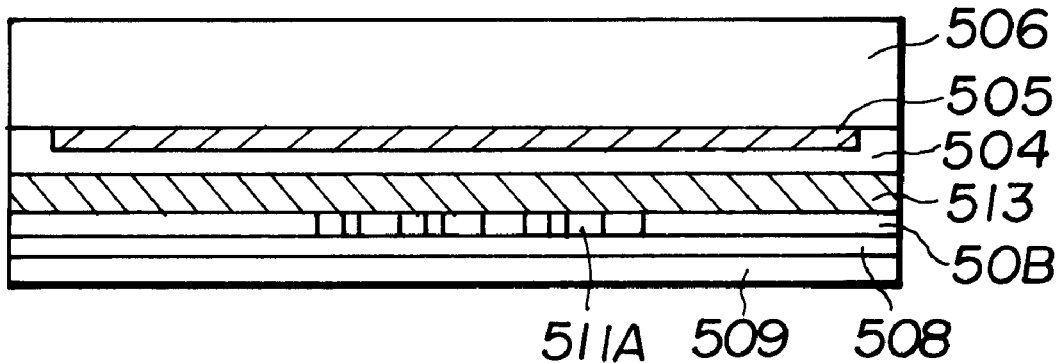
FIG. 6 is a schematic plan view of a prior art optical recording medium which has visible information.
Figure 7A:
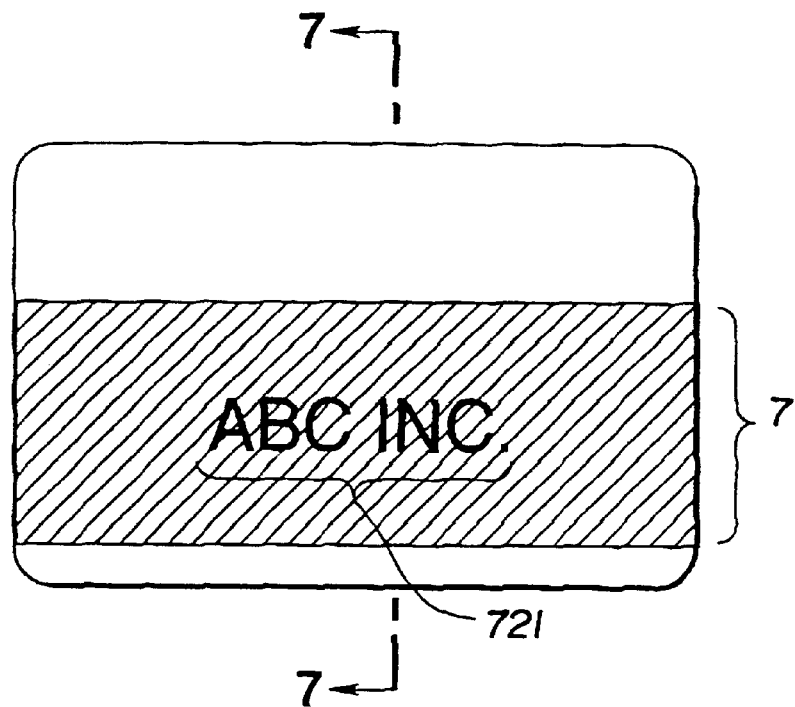
FIG. 7(a) is a schematic plan view of an optical card in accordance with the first embodiment of the invention.
Figure 7B:
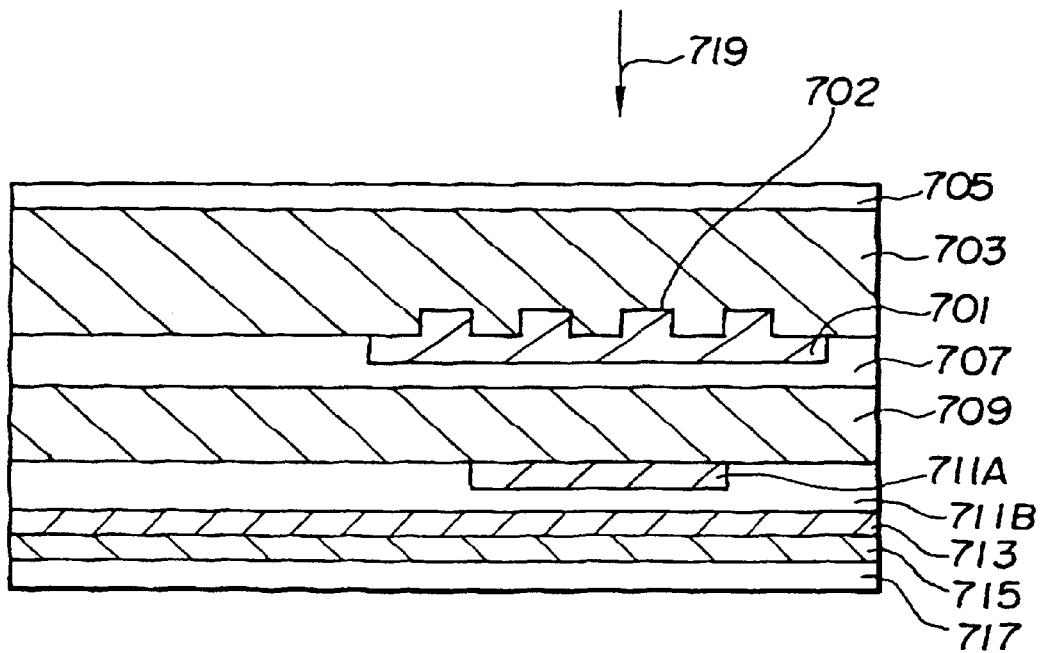
FIG. 7(b) is a schematic cross sectional view taken on line F—F of FIG. 7(a)

FIG. 7 illustrates an optical card in accordance with the first embodiment of the invention. In FIG. 7, 701 denotes an optical recording layer formed on a side of a transparent substrate 703 on which preformat 702 is provided. A hard coat 705 is formed on the transparent substrate 703 layer.

Attached to the transparent substrate 703 carrying the optical recording layer 701 using an adhesive layer 707 is a transparent protective layer 709.

A first visible information layer carrying first visible information on a side opposed to the optical recording layer 701 comprises a first layer 711A which constitutes a foreground of the first visible information, the layer 711A being inset in a second layer 711B which constitutes the background of the first visible information.

The visible information is overlaid by the optical recording region of the optical recording layer 701.

On the surface of the visible information layer 711B is formed an opaque layer 713 on which is formed a second visible information layer 715. The second visible information layer 715 is a single layer which carries second visible information, with the opaque layer 713 acting as a background. A transparent overcoat 717 is formed over the second visible information layer 715 to protect the second visible information.

In use of the medium, a radiation beam indicated as 719 is used to record information in the optical recording layer 701 or reproduce information recorded in the optical recording layer 701. The optical recording layer 701 is at least partially transmissive to light in the visible region wavelengths, and thus, the first visible information is visible to the eyes of an observer through the optical recording layer 701.

The First Visible Information Layers

In order to make characters within the first visible information layer eye-readable through the optical recording layer 701, the following process may be used. Using black ink and a known printing method, the required characters for the foreground of the first visible information are printed on one surface region of the protective layer 709 to form the first layer 711A. Then, using white ink and a known printing method, the second layer 711B forming the background to the first visible information is formed to cover the first layer 711A. Thus the first visible information layers 711A, 711B carrying the first visible information are formed.

Alternatively, black ink is printed over the surface region of the protective layer 709 except where it is required to form characters in the first information layer 711A. Then using white ink and a known printing method, the second layer 711B is formed to cover the first layer 711A.

When, as shown in this embodiment the first visible information layers 711A, 711B are provided on the surface of the protective layer 709, which does not oppose the optical recording layer 701, it is possible to prevent effectively the recording or reproducing radiation beam which has passed through the recording layer 701 from being reflected at the visible information layers 711A, 711B and returning along the irradiation direction of the radiation beam. In this embodiment, even if visible information is provided, it is possible to prevent deterioration of the C/N radio of the optical reproducing signals. As the optical recording layer 701 has a certain transmissivity in visible light, if a wavelength other than in the visible region, for example if a radiation beam 719 whose wavelength is in the infrared region is used, the radiation beam will pass through the optical recording layer 701 in some degree. If the radiation beam which has passed through the optical recording layer 701 is reflected at the down side of the optical recording layer 701 and returns in the irradiation direction of the radiation beam 719, sometimes noise gets mixed in the reproducing signals and the C/N ratio of the reproducing signals deteriorates. However by separating the first visible information layers 711A,B which have the possibility of reflecting the transmitted light of the recording or reproducing radiation beam from the optical recording layer 701 as shown in this embodiment, it is possible to prevent the recording or reproducing radiation beam which has passed through the optical recording layer 701 from being reflected from the first visible information layers 711A, 711B.

In the visible information layers 711A, 711B, materials for producing the visible information include, for example, metals, metal oxides, organic pigments, and printing inks which are a mixture of resin binder and dye or pigment. The method of producing the visible information depends on the material which constitutes the visible information layers 711A, 711B. For example for metal or metal oxides, vacuum deposition methods such as vacuum evaporation method or sputtering method and so on are preferable. For organic pigments, paint methods such as gravure coating methods and so on, or print methods such as screen printing methods and so on are preferable. For printing ink, it is preferable to select a printing method which is suitable for producing visible information using known printing methods such as offset printing or screen printing and so on. The use of printing ink and a printing method is preferable because it makes the cost of producing the optical recording medium cheaper, and enables the visible information layers 711A,B to be made thinner. A printing ink which is obtainable by adding dye or pigment in a suitable degree to a resin solution for ink is commonly commercially available. As the resin solution for the print ink, for example a resin solution containing acrylate resin and acryl polyol (trade name: ACRYDIC (Dainippon Ink and Chemicals Inc)), a resin solution containing polyisocyanate, polyester polyol, alkyd polyol and block polyisocyanate, (trade name: BURNOCK (Dainippon Ink and Chemical Inc)), a resin solution containing urethane acrylate, unsaturated polyester and epoxy acrylate, (trade name: UNIDIC (Dainippon Ink and Chemicals Inc)), a resin solution containing vinyl chloride and acrylate resin, a resin solution (trade name: SERICOL 13 (Teikoku Printing Inks Mfg. Co. Ltd)) (trade name: SS8 (Toyo Ink Mfg. Co. Ltd)), a resin solution containing polyester resin (trade name: SERICOL EGS (Teikoku Printing Inks Mfg. Co. Ltd)) and so on may be used.

The ink will be selected to be quick-drying, and considering the effect of the residual quantity of solvent on the durability of the optical recording medium. The dye or pigment to be added to these resin solutions will depend on the required colour of the visible information. For example, white pigments such as titanium oxide and so on may be used to obtain a white printed layer as the first layer 711A or the second layer 711B. More specifically, a white ink (trade name: SERICOL 13, 611-A (Teikoku Printing Inks Mfg. Co. Ltd)) which is made of a mixture of above mentioned SERICOL 13 MEDIUM and titanium oxide, a white ink (trade name: SS 8, 611-S (Toyo Ink Mfg. Co. Ltd)) which is made of a mixture of SS8 medium and titanium oxide or a white ink (trade name: SERICOL EGS, 611-A (Teikoku Printing Inks Mfg. Co. Ltd)) which is made of a mixture of SERICOL EGS MEDIUM and titanium oxide and so on may be used.

Black pigments such as carbon black and so on may be used to obtain a black printed layer as either the first layer 711A or the second layer 711B.

More specifically, a black ink (trade name: SERICOL 13, 911-S (Teikoku Printing Inks Mfg. Co. Ltd)) which is made of a mixture of above mentioned Sericol 13 medium and black pigment such as carbon black and so on, a black ink (trade name: SS8, 911-S (Toyo Ink Mfg. Co. Ltd)) which is made of a mixture of SS8 medium and black pigment such as carbon black and so on, or a black ink (trade name: SERICOL EGS, 911-S (Teikoku Ink Manufacturing Inc.)) which is made of a mixture of Sericol EGS medium and black pigment such as carbon black and so on, or ink which is made of a mixture of the above mentioned media and a suitable dye or pigment in suitable degree may be used. In this embodiment, as long as the first visible layers 711A, 711B are eye-readable through the optical recording layer 701, it is possible to colour the first visible information layer 711A,B any colour except white or black. If the first visible information layer 711A, 711B is formed by a printed layer the quantity of the dye or the pigment in the printed layer will contribute to the ease of visibility of the first visible information layer. The quantity of the dye or pigment in the printed layer is preferably 30 wt % or more but 70 wt % or less, more preferably 30 wt % or more but 60 wt % or less. At this range, the printed layer can be prevented from detachment or cracking. The thickness of the printed layer is preferably 1 $\mu$m or more, but 10 $\mu$m or less, especially 1 $\mu$m or more, but 7 $\mu$m or less in order to maintain the quantity of information in the printed layer.

In order to control the reflection of the radiation beam for reproducing optically recorded information from the surface of the first visible information layers 711A, 711B, this surface is preferably arranged to have a reflectivity of 30% or less, especially 20% or less, even more preferably 10% or less. This prevents deterioration of the C/N ratio caused by the reflection of the radiation beam which passes through the optical recording layer 701.

The required reflectivity of the surface of the first visible information layers 711A, 711B can be obtained without providing a reflection preventing layer or a surface treatment of the first visible information layers 711A, 711B. For example the required reflectivity can be achieved by choosing a suitable material for the first layer 711A and the second layer 711B of the first visual information layers. In the case that a white printed layer is used as the first layer 711A and/or the second layer 711B, such that the reflectivity of the surface opposed to the optical recording layer 701 is 30% or less can be obtained by forming a printed layer which has approximately from 1 $\mu$m to 1 $\mu$m thickness and a white pigment content of between 30 wt % and 70 wt %, for example using a ink which contains approximately 20–30 wt % of the above mentioned white pigment (for example titanium oxide). By adopting the above mentioned pigment content range and thickness range, it is possible to prevent the first visible information layers from having a high reflectivity and also to prevent detachment of the printed layers from the optical card or cracking of the printed layers 711A,B when bending the optical card caused by brittleness of the printed layers 711A,B.

Second Visible Information Layer

The second visible information layer 715 carrying the second visible information constitutes the foreground of the second visible information with the opaque layer 713 constituting the background for the second visible information. The second visible information layer is formed on the first visible information layers 711A,B with the opaque layer 713 interposed between the first and second visible information layers. The second visible information layer 715 basically does not effect the reproducing signals. Therefore, there is no necessity for the strict selection and control of the thickness or composition of the second visible information layer 715.

If a printed layer is used as the second visible information layer 715, it is preferable that there is no detachment of the second visible information layer from the optical card or cracking in the second visible information layer 715 when the optical card is bent. Therefore, the above mentioned structures and materials used for the first visible information layers 711A,B may advantageously be used for the second information printed layer 715.

In this embodiment the second visible information layer 715 comprises a single layer. However the second visible information layer 715 can be constituted by a plurality of separate layers as in the first visible information layers 711A,B.

Form of the First and Second Visible Information

Visible information which is carried by the first and the second visible information layers 711A, B, 715 includes all information whose presence and meaning can be visibly recognised by an observer using visible radiation within the 400–700 nm wavelength band. Such visible information may comprise, for example a portrait of the face of the optical card owner, information relating to the optical card owner, such as characters representing the owner's name, characters representing the name of the distributor, trade marks, designs and so on. Machine readable information such as an optical recording medium's lot number etc., which may be read by, for example, a barcode reader may constitute the visible information. In a medium in accordance with this invention any meaningful information which can be optically read out, from the first or second visible information layers 711A,B; 715 may be regarded as visible information.

The Opaque Layer

In this embodiment of the invention, the first visible information is eye-readable through the optical recording layer 701. The second visible information is eye-readable from the opposite side of the optical card. The opaque layer 713 is provided in order to prevent the first visible information and the second visible information from interfering with each other. If the second layer 711B of the first visible information layer consists of a printed layer, the pigment content in the printed layer for the second layer 711B is preferably 70 wt % or less, more preferably 60 wt % or less, and thickness of the layer 711B is preferably 1 $\mu$m or more, but 10 $\mu$m or less for maintaining the quantity of the first visible information in order to prevent a mixture of noise into the reproducing information of the information recorded in the optical recording layer, and also to prevent detachment of the layer 711B from the optical card or cracking of the layer 711B. In this case however, it is difficult for the second layer 711B in the first visible information layer to itself prevent total transmission of visible light, leading to interference between the first visible information and the second visible information. For example if the second visible information of the optical card shown in FIG. 7 is seen through the overcoat layer 717, the first visible information carried by the first visible information layers 711A, 711B can be recognized visually. As a result there will be a deterioration of quality of the first and second visible information. To solve this problem, the opaque layer 713 is provided between the first visible information layers 711A, 711B and the second visible information layer 715, preventing transmission of the visible light between the two sets of visible information layers 711A, 711B; 717 and the consequent interference of the first and second visible information.

The opaque layer 713 preferably has low transmission for visible light, for example preferably 10% or less for light of wavelength 400 nm–700 nm. Its thickness is preferably 3 $\mu$m or more, but 30 $\mu$m or less so as to prevent the optical recording medium (especially for an optical card) getting thicker. Such an opaque layer 713 may be obtained using for example a printed layer. The colour of the opaque layer 713 is preferably white or a similar colour so as not to affect the colour of the first and second visible information. In the case that the opaque layer 713 is formed by a printed layer, a printed layer containing at least one of aluminium powder and aluminium oxide powder is preferable. The content of the powder in the printed layer is preferably 30–70 wt %, more preferably 30–60 wt % in order to prevent detachment of the printed layer from the optical recording medium or cracking of the printed layer. Such a printed layer of between 3–30 $\mu$m thickness can be obtained by using a liquid resin for print ink into which at least one of aluminium powder and aluminium oxide powder is incorporated so that the powder's concentration is about 10–30 wt %, and by employing a known printing method. For example, by preparing a mixture of liquid resin including 10–20 wt % of polyester resin (trade name: SERICOL EGS (Teikoku Printing Inks Mfg. Co, Ltd)) in which 10–30 wt % of aluminium powder whose average particle size is a range of approximately 0.1–3 $\mu$m or 10–30 wt % of aluminium oxide powder having similar average particle size, and then printing the mixture by employing known printing methods, such as screen printing method etc., a 3–30 $\mu$m printed layer exhibiting excellent low transmissivity in visible light region, and having little detachment or cracking when the optical card is bent, suitable for the opaque layer 713, can be obtained. Such an opaque layer 713 sometimes has a reflection factor of over 30% for light in the infrared region, and thus these materials are not suitable for the layers 711A, 711B of the first visible information layers. However, if the opaque layer 713 is provided on the transparent protective layer 709, with the first visible information layer 711A, 711B interposed between the opaque layer 713 and protective layer 709, the surface of layers 711A, 711B opposed to the optical recording layer 701 having a reflection factor of less than 30%, there is no noise in the optical reproducing signals.

The opaque layer 713 may be constituted by plural layers, for example laminated printed layers. In this case, the transmissivity to visible light can be prevented more effectively. For example laminated films each of which comprises a 5 $\mu$m thickness printed layer made of an ink including a mixture of, for example, the above mentioned aluminum powder or aluminium oxide powder and 4 $\mu$m thickness printed layer which is made of white ink including titanium oxide which is useful for the layer 711B of the first visible information layer, are preferable for the opaque layer 713 as the transmissivity for visible light can be 10% less.

The Optical Recording Layer

As the optical recording layer 701, a layer which has some transmissivity for visible light but which does not substantially affect the information recording or reproducing by a radiation beam 719, is preferable. More specifically a layer 701 which has at least 10% or more, preferably 20% or more transmissivity for visible light in the 400–700 nm wavelength band is preferable.

As the optical recording material constituting the optical recording layer 701, it is preferable to select a suitable material which satisfy above mentioned condition from known materials. For example metals, metal compounds, organic dyes, metals containing organic dye or metal compounds and so on may be used.

An organic dye has a greater wavelength dependent light transmissivity compared with metals. Some organic dyes show superior absorption for light in the infrared region (i.e. 760 nm or more) and high transmissivity in the visible wavelength light. Such an organic dye is preferable as the optical recording layer 701. If the organic dye is applied to the optical recording layer 701, its thickness is determined so as to obtain nearly the largest surface reflection factor which is related to the radiation beam used for recording or reproducing. Therefore, it is preferable to select an organic dye which shows transmissivity in visible light with such a thickness.

For the organic dye, polymethine dye, anthraquinon derivative, cyanine dye, merocyanine dye, naphtoquinone dye, dioxazine compound, triphenodithiazine compound, phenanthrene derivative, phthalocynaine dye, pyrylium dye, croconium dye, azo dye, azulene and so on may be used. In particular polymethine dye has the merits of obtaining high recording sensitivity and good durability. Furthermore it is possible to produce the optical recording medium cheaply, as compared to using a vacuum deposition method such as evaporation, sputtering and so on, because the polymethine dye can be formed by wet coating. For example using 1,1,5,5,-tetrakis (pdiethylaminophenyl)-2,4-pentadieniumperchlorate as the organic dye for the optical recording medium, gives the highest reflection factor (almost 12%) with a thickness of approximately 900–100 nm. A dye layer which has such thickness having 80–95% transmissivity in the visible light wavelength region which is preferable.

Transparent Substrate, Adhesive Layer and Transparent Protective Layer

As the transparent substrate, a material which has superior flatness and few optical distortions is preferable. Further a material having high transmissivity for the laser radiation 719 which is used for the recording and reproducing, and for radiation within the 400–700 nm wavelength band is preferable. Plastic sheets or films may be used, for example acrylate resin, polyester resin, polycarbonate resin, polystyrene resin, vinyl resin, polyamide resin, polyacetal resin. Especially, acrylate resin and polycarbonate resin which have high transmissivity of laser and small double refraction are preferable.

As the adhesive agent used for the adhesive layer 707, it is necessary to use an adhesive agent which does not have a bad effect on the material which constitutes the optical recording layer 701. Examples of suitable materials are a simple monomer or copolymer of vinyl monomer such as vinyl acetate, ethylene, acrylic acid, acrylic amide and so on, or a thermoplastics adhesive agent such as polyamide, polyester, epoxy and so on, or thermosetting adhesive agent such as amino resin (urea resin, melamine resin), phenol resin, epoxy resin, urethane resin, thermosetting vinyl resin and so on, or rubber adhesive agent such as natural rubber, nitrile rubber, chlororubber, silicone rubber and so on. A hot-melt adhesive agent, for example ethylene- vinyl acetate copolymer or ethylene-acrylic acid copolymer is preferable, as it is then possible to simplify the manufacturing process.

As the protective layer 709, a material which has superior flatness and transmissivity in visible light may be used, but if durability is taken into consideration, the same material as the transparent substrate 703 or a material which has a similar physical characteristics such as thermal expansion coefficient and so on to the material used for the transparent substrate 703 is preferable. The thickness of the transparent substrate 705 of the transparent protective layer 709 so as to enable the radiation beam for recording or reproducing to pass through, is preferably in a range of 0.4 mm±0.04 mm for the example of an optical card. The sum of the thicknesses of the adhesive layer 709 and either the transparent substrate 703 or transparent protective layer 709 to enable the radiation beam for recording or reproducing to pass through is preferably in the range of 0.2 mm–0.5 mm. In this case, it is possible to prevent the deterioration of the C/N ratio which may occur by provision of the first visible information layer 711A, 711B.

Second Embodiment of the Invention

Figure 8A:
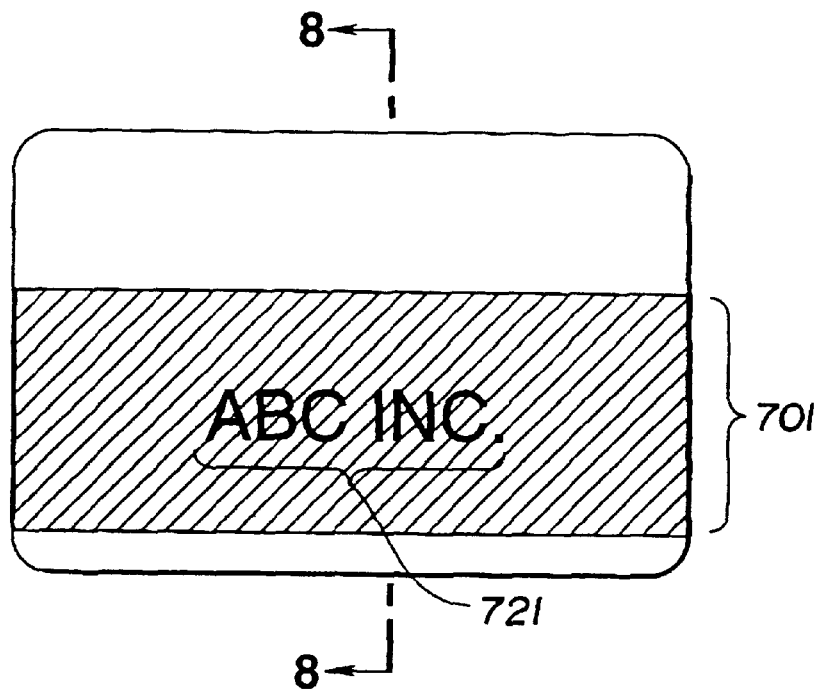
FIG. 8(a) is a schematic plan view of an optical card in accordance with the second embodiment of the invention.
Figure 8B:
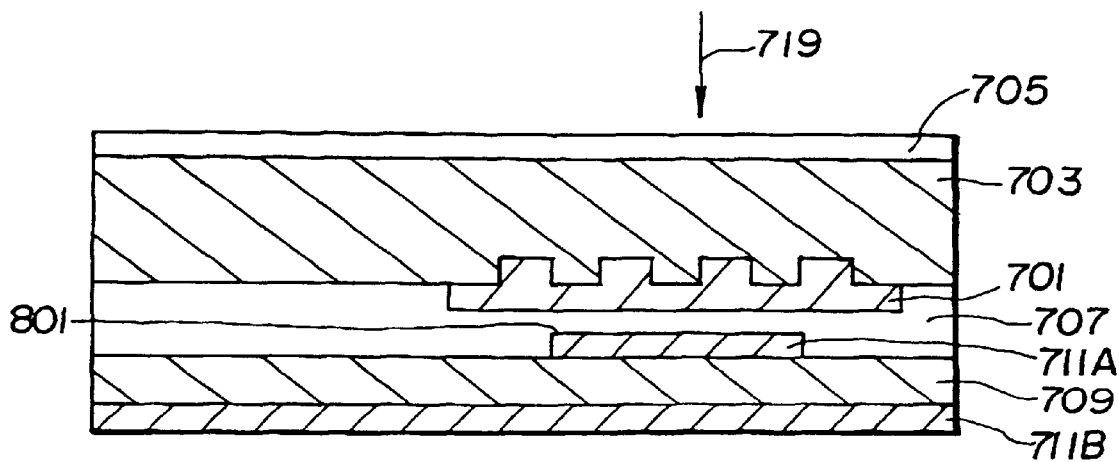
FIG. 8(b) is a schematic cross sectional view taken on line G—G of FIG. 8(a)

The second embodiment of the invention to be described is illustrated in FIGS. 8(*a*) and (*b*). In this and the further embodiments of the invention to be described, corresponding numerals are used to designate corresponding features as in the first embodiment.

In the optical recording medium of this second embodiment of the invention, the first layer 711A of the first visible information layer which constitutes the foreground of the first visible information is provided on one surface of the protective layer 709, that is the side opposing the optical recording layer 701. The second layer 711B which constitutes a background of the first visible information is provided on the outside of the protective layer 709. The first layer 711A has a surface 801 which has a low reflectivity.

In this structure, it is difficult to fake the visible information. The first layer 711A is provided between the substrate 703 and the protective layer 709 and is sealed with the adhesive layer 707. This structure is useful to prevent forgeries from being produced. If the first information shown in FIG. 8(*a*) is formed, there is one way of providing the second layer 711B between the surface of the protective layer 709 which opposes the optical recording layer 701 and the first layer 711A. However if the surface of the visible information layers 711A, 711B has a reflectivity of more than 5% for the radiation beam used for recording and reproducing, by providing the visible information layers 711A, 711B at the opposite side of the optical recording medium there is a possibility that radiation beam passing through the optical recording layer 701 will be reflected from the information layers 711A, 711B and be detected so as to cause a deterioration in the C/N.

On the other hand, if the second layer 711B is provided on the outer surface of the protective layer 709 to increase the distance between the second layer 711B and the optical recording layer 701, and if the second layer 711B has a surface reflection factor of 30% or less, it is possible to prevent light reflected from the second layer 711B from being detrimental to the C/N ratio of the optical reproducing information. As the material for the second layer 711B can be selected from many materials, it is possible to design the visible information to be more colourful.

On the other hand, the first layer 711A is provided on the opposite side of the optical recording layer 701 in order to make the alteration of the visible information difficult. If the surface of the layer 711A which opposes the optical recording layer 701 has high reflectivity at the wavelength of the radiation beam light 719, there is a possibility that the C/N ratio of the optical reproducing signals will deteriorate. Therefore, the surface of the first layer 711A preferably has low reflectivity, preferably 5% or less at the wavelength of the radiation beam light 719.

In order to reduce the surface reflection, a printed layer having a mat surface or a reflection preventing layer may be provided on the surface 801 of the first layer 711A. A printed layer having a mat surface may be provided by mixing a lean solvent which is as to a resin in a print ink into the print ink and forming the printed layer using the ink containing the lean solvent. Alternatively commercially available ink or medium which provides a printed layer having a mat surface may be used, for example, a resin solution including acrylate resin (trade name: CAV MEIBAN MEDIUM (Seiko Advance Inc.)).

The reflection preventing layer 801 may be formed on only the surface of the first layer 711A, or over the whole surface of the protective layer 709 on which the first layer 711A is formed in order to cover the first layer 711A. The use of a layer which has a reflection preventing effect on the recording and/or reproducing radiation beam 719 is preferable. Optical films or reflection preventing paints and so on may be used, preferably a single layer reflection preventing layer because of the lower manufacturing price.

As a single layer reflection preventing layer, a material which satisfies the following formulae (I) and (II) may be used.

$$n_f d = \lambda_0 \quad (I)$$

$$n_f = (n_f f_g)^{1/2} \quad (II)$$

where:
$\lambda_0$ is the center wavelength of visible light,
$n_0$ is the refractive index of the adhesive agent,
$n_g$ is the refractive index of the first layer 711A under the reflection preventing layer 801, and
d is the thickness of the reflection preventing layer 801.

If the reflection preventing layer 801 is a reflection preventing paint, velvet coating paint, carbon black paint and so on may be used. The reflection preventing layer 801 is formed on the first layer 711A by printing or coating.

In this embodiment, forming the first layer 711A with material absorbing radiation within wavelength band of the light beam 719, is preferable, as it improves the C/N ratio of the optical reproducing signals. The light absorbent material is chosen so as to absorb light within the wavelength region of the radiation light beam 719, and print ink including a pigment which exhibits large absorbance of the radiation light beam and the light of the visible wavelength, for example black ink including carbon black, is preferably used because of high light absorption and low manufacturing costs. Furthermore, since this kind of black ink exhibits large absorbance of the light of visible wavelength, the contrast of the first visible information may increase when the visible information is read by eye under the visible light.

Examples of suitable black print ink which can be used for formation of the visible information layer include the black ink, (trade name: SERICOL 13, 911-S, (Teikoku Printing Inks Mfg. Co. Ltd)) which is made of a mixture of above mentioned Sericol 13 and a black pigment such as carbon black, a black ink (trade name: SERICOL EGS, 911-S (Teikoku Ink Manufacturing Inc.) which is made of mixture of above mentioned Sericol EGS and a black pigment such as carbon black.

If a printed layer is used as the first visible information layer 711A, the dye, pigment, or dye and pigment content is not restricted. In this case, it is possible to add the desired content in order to obtain the desired light absorption as long as the layer is capable of being printed. In this particular embodiment, as the first layer 711A is sealed by the substrate 703 and the protective layer 709, the durability against bending of the card which is necessary for the visible information layer of the first embodiment is not needed. However as cracking spoils the quality of the visible information, a content of 80 wt % or less of the dye and/or pigment is preferable.

Figure 9:
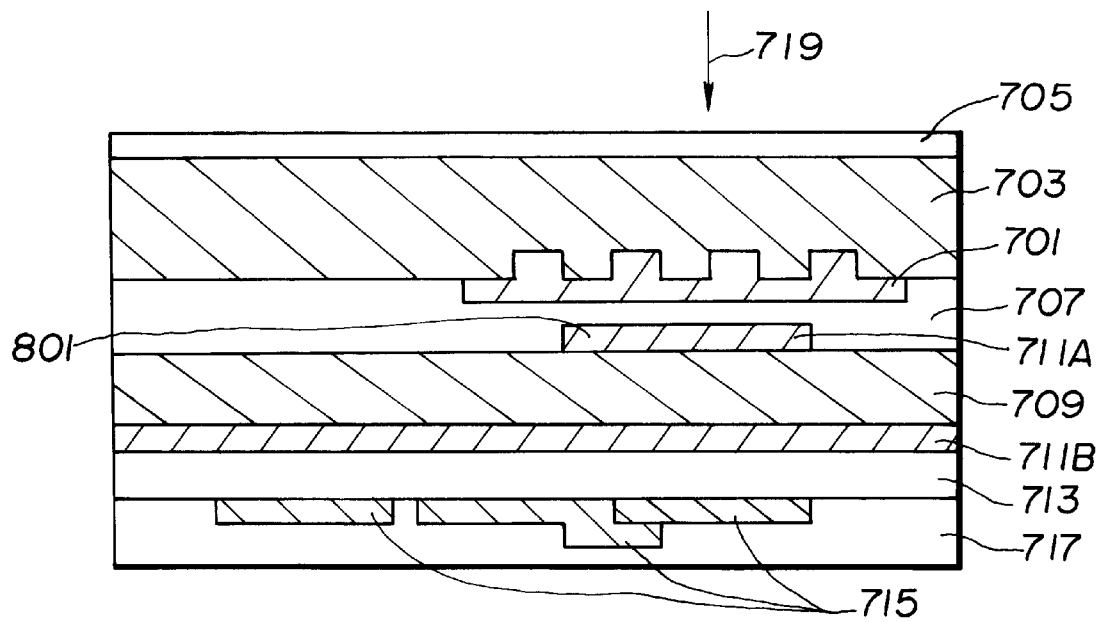
FIG. 9 is a schematic cross sectional view of an optical card in accordance with a variation of the second embodiment he invention.

Turning now also to FIG. 9, in this embodiment, the second visible information layer 715 of the first embodiment may be formed on the second layer 711B. If the second visible information layer 715 is provided, it is preferable to provide the opaque layer 713 between the second layer 711B and the second visible information layer 715 using an opaque layer 713 whose structure and material may be as in the first embodiment.

Third Embodiment of the Invention

Figure 10A:
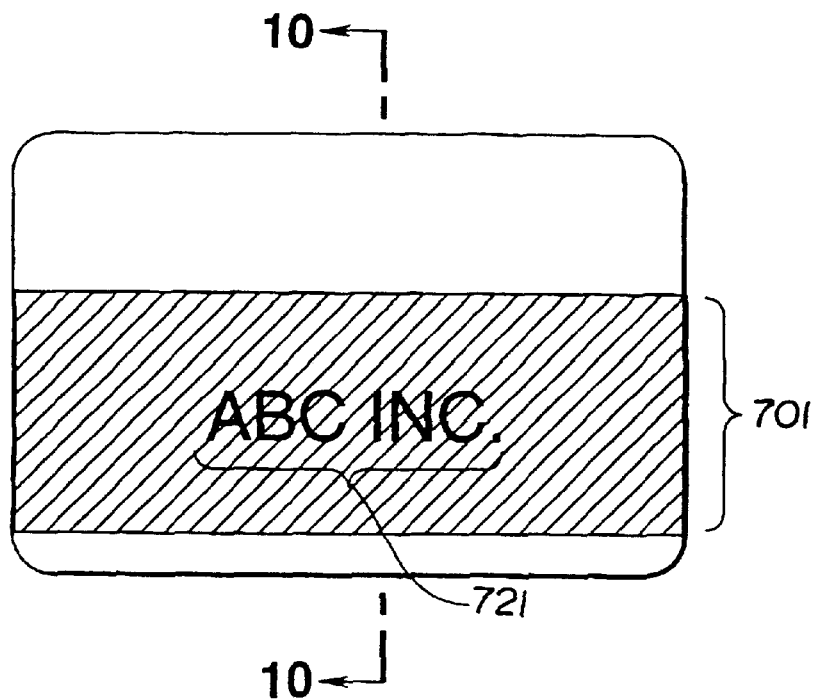
FIG. 10(a) is a schematic plan view of an optical card in accordance with the third embodiment of the invention.
Figure 10B:
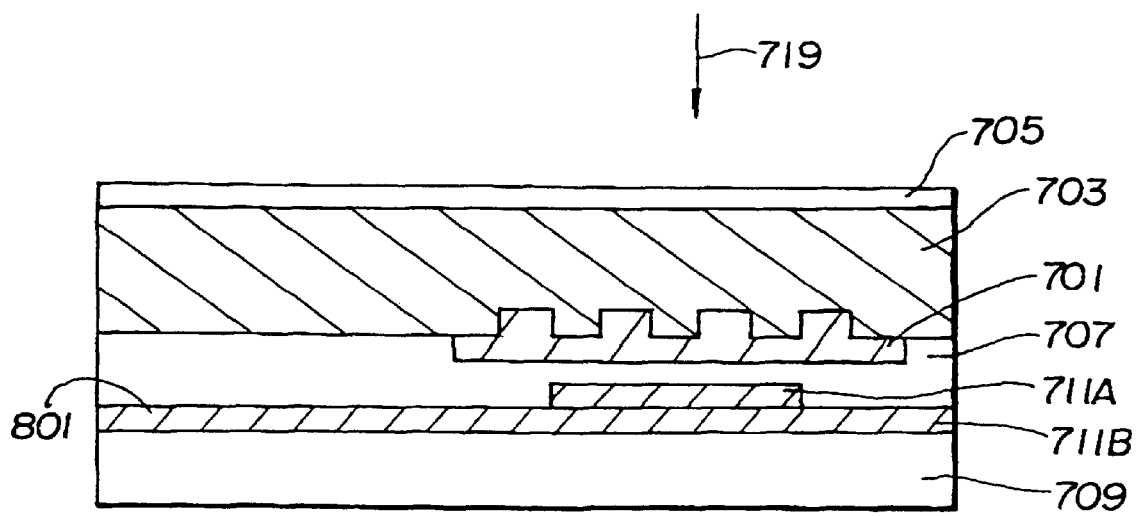
FIG. 10(b) is a schematic cross sectional view taken on line H—H of FIG. 9(a)

The third embodiment of the invention will be described with reference to FIGS. 10(a) and (b).

In the optical recording medium of this embodiment, the first layer 711A and the second layer 711B which constitute the first visible information layers are provided on the surface of the protective layer 709, which opposes the optical recording layer 701. The surface of the layers 711A and 711B which opposes the optical recording layer 701 has low reflectivity. In order to reduce the surface reflectivity of the visible information layers 711A, 711B, the means described in relation to Embodiment 2 may be used.

In this third embodiment, the second visible information layer 715 of the first embodiment may be formed on the surface of the protective layer 709 which does not oppose the optical recording layer 701. If the second visible information layer 715 is provided, it is preferable to provide an opaque layer 713 between the second layer 711 and the second visible information layer. The structure and material of the opaque layer will be as in the first embodiment.

Fourth Embodiment of the Invention

Figure 11A:
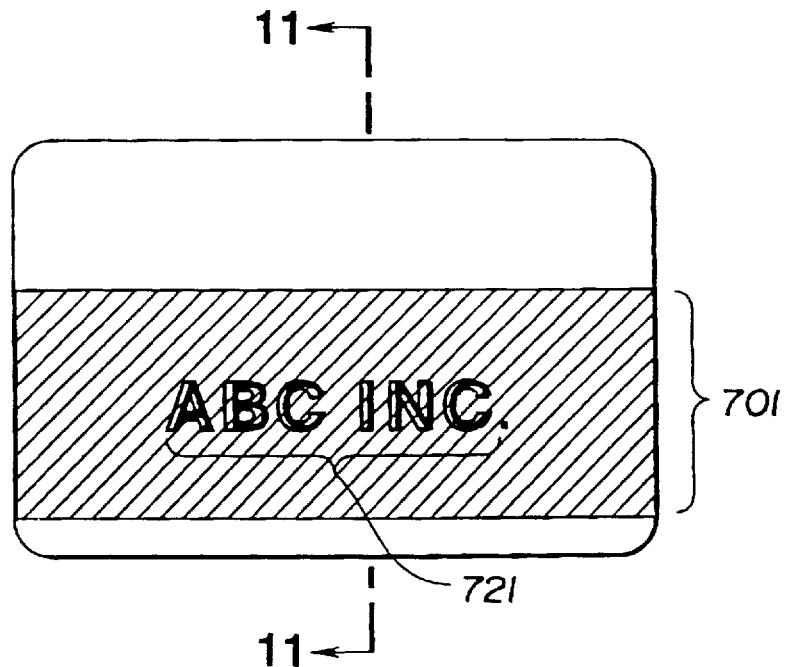
FIG. 11(a) is a schematic plan view of an optical card in accordance with the fourth embodiment of the invention.

The fourth embodiment of the invention will be described with references to FIGS. 11(a) and (b).

In this embodiment, the foreground forming first visible information layer 711A comprises two layers 711A-1 and 711A-2.

The layer 711A-1 is provided on the surface of the protective layer 709 which opposes the optical recording layer 701. The 711A-2 layer is provided on the other surface of the protective layer 709 which does not oppose the optical recording layer 701. The background forming second layer 711B is provided on the surface of the protective layer not opposing the optical recording layer 701 in order to cover the second layer 711A-2.

As the result, the first visible information can be recognised as folding visible information. It is more difficult to fake the visible information by the plural first layers 711A-2, 711A-1 have a certain positional relation to each other. If the plural first layers 711A-1, 711A-2 carry the same or similar visible information at corresponding positions, it is possible to provide a three dimensional effect in the first visible information as shown in FIG. 11(a), and to provide high grade visible information.

In such a medium, three dimensional information may thus be observed. This makes forgery of the medium more difficult as the various layers must be accurately aligned.

Figure 12:
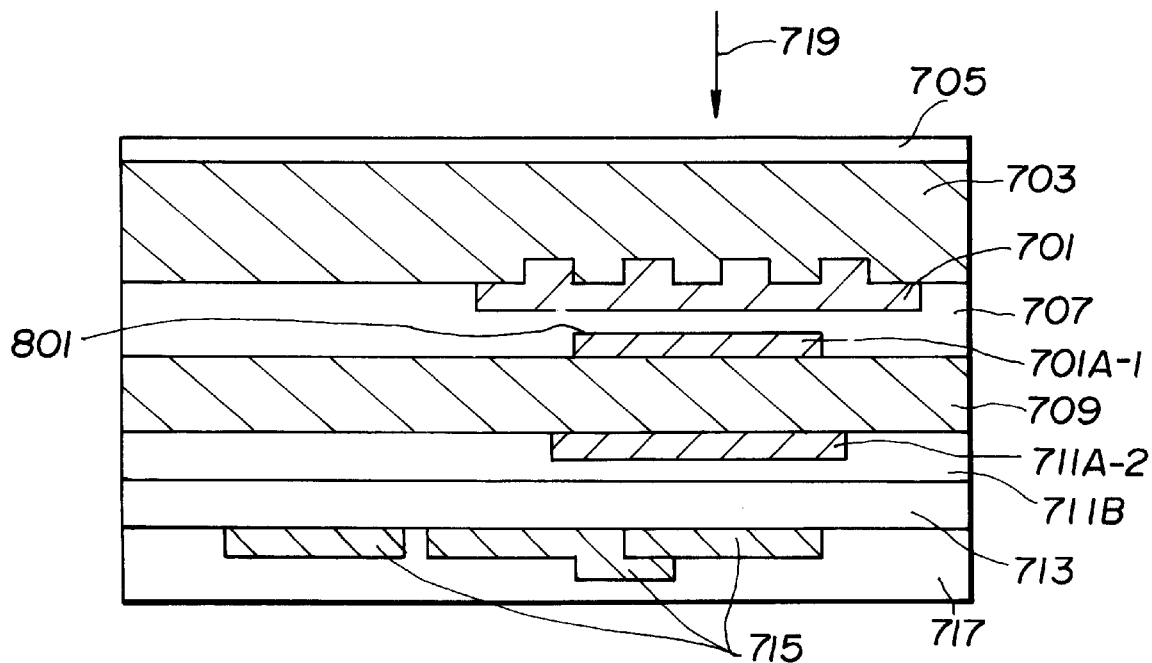
FIG. 12 is a schematic cross sectional view of an optical card in accordance with a variation of the fourth embodiment of the invention.

Referring now also to FIG. 12, if the second visible information layer 715 is provided, it is preferable to provide the opaque layer 713 between the second layer 711B and the second visible information layer 715. The opaque layer 713 may have the structure and materials as in the first embodiment.

Variations of the Embodiments

In a variation of the optical recording medium shown in any of the embodiments of the invention described above, it is possible to provide a magnetic stripe, IC chip or other information recording means. It is also possible to provide a colour image by, for example, thermal printing on a portion of the outer surface of the transparent substrate 703 which is not overlaid by the optical recording region of the optical recording layer 701.

Figure 13A:
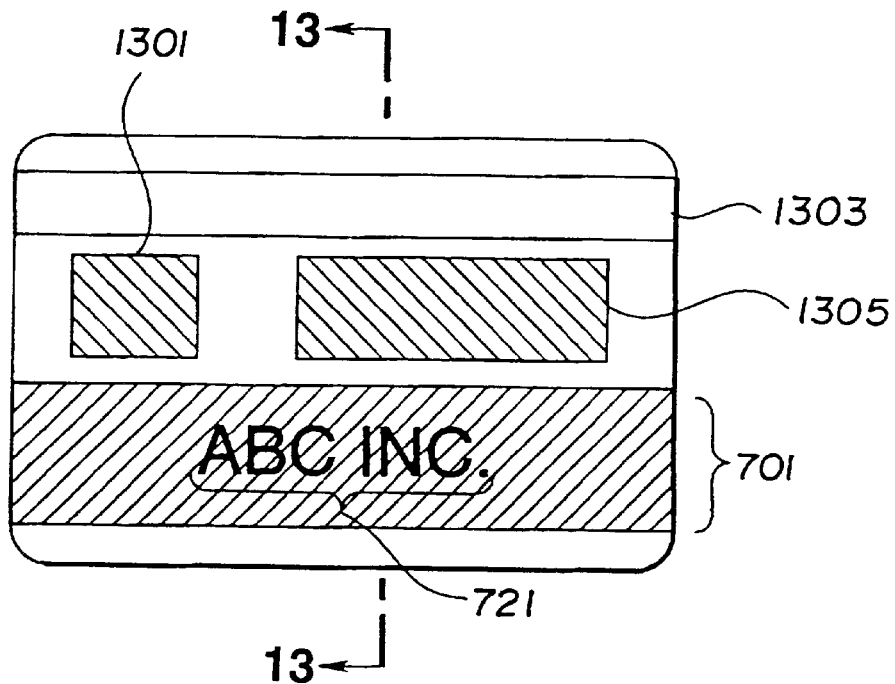
FIG. 13(a) is a schematic plan view of an optical card in accordance with a variation of the first embodiment of the invention.
Figure 13B:
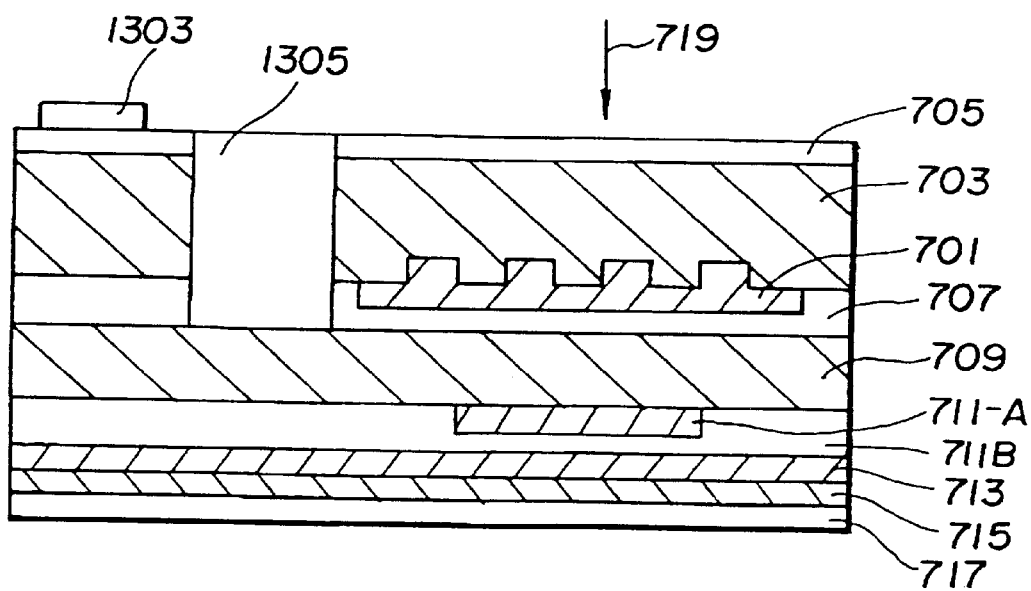
FIG. 13(b) is a schematic cross sectional view taken on line J—J of FIG. 13(a)

For example, FIG. 13 illustrates a card as in the first embodiment of the invention but including a usually readable colour image 1301 of, for example the owner of the card. The card also carries a magnetic stripe 1303 carrying further magnetically recorded information and an IC chip 1305.

EXAMPLE 1

This example is in accordance with the first embodiment of the invention as illustrated in FIG. 7.

The medium was formed by preparing a polymethylmethacrylate substrate (trade name: CLAREX S (Witto Jushi Kogyo Co. Ltd)) of thickness is 0.4 mm, size 54 mm×85 mm as a transparent substrate 703, then washing and drying the substrate. A preformat pattern 702 was formed on the transparent substrate 703 by a thermal press method. 3 wt % diacetonalcohol solution of 1,1,5,5-tetrakis (p-diethylaminophenyl)-2, 4-pentadieniumperchlorate (trade name: IR-820 (Nippon Kayaku Co. Ltd)) was gravure coated on the optical recording region including the preformat region 702, then the substrate 703 was dried to form a optical recording layer 701 of thickness 90 nm (900 Å).

A polymethylmethacrylate substrate of thickness 0.3 mm, size 54 mm×85 mm was prepared as the protective layer 709. On the protective layer 709, multilayer printing was performed as follows to form the first and the second visible information layers 711A, 711B. Firstly, a black ink which was made of a mixture of 25 wt % carbon black and resin solution containing vinyl chloride and acrylate resin (trade name: SERICOL 13 MEDIUM (Teikoku Printing Inks Mfg. Co. Ltd)) was prepared. A white ink, which was made of a mixture of 25 wt % titanium oxide particle having 1 μm average particle size, and a resin solution containing vinyl chloride and acrylate resin (trade name: SERICOL 13 MEDIUM (Teikoku Printing Inks Mfg. Co. Ltd)) was prepared. An ink which was made of a mixture of 25 wt % titanium oxide particle (trade name: SILVER 607A (Seiko Advance Inc.)) and fish scale shape aluminium having 1 μm average particle size and resin solution containing polyester resin (trade name: SERICOL EGS MEDIUM (Teikoku Printing Inks Mfg. Co. Ltd)) was prepared as a white silver ink which gave a white silver printed layer. An ink which was made of a mixture of 20 wt % phthalocynaine blue and resin solution containing polyester resin (trade name: SERICOL EGS MEDIUM (Teikoku Printing Inks Mfg. Co. Ltd)) was prepared as a dark blue ink. An ink which was made of a mixture of 25 wt % brilliant carmin and resin solution containing polyester resin (trade name: SERICOL EGS MEDIUM (Teikoku Printing Inks Mfg. Co. Ltd)) was prepared as a red ink.

The black ink was screen printed on a region of the surface of the protective layer 709, the region being overlaid by the optical recording region 701 when the protective layer 709 is bonded with the transparent substrate 703, to form the first layer 711A of a thickness 3 µm which constitutes the foreground of the first visible information. Then, the white ink was screen printed on one side of the protective layer where the first layer 711A was formed on to form the second layer 711B of a thickness 4 µm which constituted the background of the first visible information. The contents of the black pigment in the first layer 711A and the white pigment in the second layer 711B were almost 60 wt %.

The reflectivity for infrared light of the first layer 711A and the second layer 711B with the protective layer interposed were measured with a spectrophotometer (trade name: MCPD-1000 (Otsuka Electronics Co. Ltd)). The reflectivities were 20% or less.

The white silver ink and the white ink were then screen printed on the second layer 711B in turn to form an opaque layer consisting of two printed layers of respective thicknesses of 5 µm and 4 µm. When this opaque layer was formed on a glass transparent to visible wave lengths (400–700 nm), the transmissivity was 5% or less. The pigment content of each printed layer which together constitute the opaque layer 713 was 60 wt % or less.

The black ink, the dark blue ink and red ink were screen printed on the opaque layer 713 to form the second visible information layer 715. The thickness of these films were 4 µm. The pigment content of each printed layer which constituted the second information layer 715 was 60 wt % or less.

A transparent resin (trade name: SS-25 MEDIUM (Toyo Ink Mfg. Co, Ltd)) was screen printed twice on the second information layer 715 to form the transparent overcoat layer 717. Then the transparent substrate 703 with the optical recording layer 701 and the transparent protective layer 709 with the first and second visible information layers 711A, 711B, 715 were bonded using a hot-melt type dry film (trade name: HIRODINE 7500, Exp 80 (Hirodine Kogyo Co. Ltd)) in order to oppose the optical recording layer 701 and the first visible information layers 711A, B. Finally a hard coat material (trade name: UNIDIC 17-824-9 (Dainippon Ink and Chemicals Inc)) which included light setting type acrylate resin prepolymer was spin coated on the surface of the transparent substrate 703 not opposed to the optical recording layer 701. The hard coat material was cured by UV light to form a hard coat layer 705 and to obtain a optical card as shown in FIG. 7.

When the optical card was observed from the side on which the radiation beam 719 was incident, black characters over the blue background were recognizable within the optical recording region 711A as the first visible information. When the optical card was seen from the protective layer 717 side, a visible picture composed of black printed layer, dark blue printed layer and red printed layer was recognisable. When the optical card was observed under a C light source as a standard light source which is standardized under Japanese Industrial Standard (JIS)—8720, there was little interference between the first visible information and the second visible information. The C/N ratio of the optical reproducing signals of the optical card was measured using a optical recording/reproducing apparatus (trade name: RW-50; wavelength 830 nm (Canon Inc.)). A superior C/N ratio of 58–61 dB was obtained.

REFERENCE EXAMPLE 1

In this reference example, a optical card was prepared in the same way as in Example 1, except that the opaque layer 713 was not formed.

When the optical card was observed under a C light source as a standard light source, the second visible information was clearly recognisable from the side of the card on which the radiation beam was incident. From the protective layer 717 side of the card the first visible information was clearly recognisable.

REFERENCE EXAMPLE 2

In this reference example, an optical card was prepared in the same way as the Example 1, except that the second layer 711B of the first visible information layers 711A,B was not formed.

The C/N measurement of the optical reproducing signals on the optical card was performed. As the result, the C/N ratio was 54 db, which is inferior to the optical card of Example 1. This result is thought to be due to the opaque layer 713 in some parts having a high surface reflection ratio of 50% for infrared region light. Therefore the reproducing radiation beam was reflected from the opaque layer 713.

REFERENCE EXAMPLE 3

An optical card was prepared in the same way as in Example 1, except that the opaque layer 713 was omitted, the content of titanium oxide particle of the second layer 711B of the first visible information layer was increased to 85 wt %.

When the optical card was observed under the C light source, there was little interference between the first visible information and the second visible information.

Figure 14A:
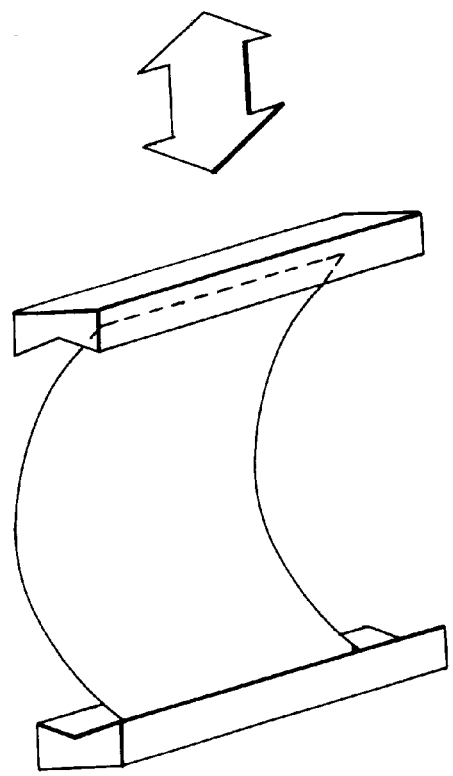
FIGS. 14(a) and (b) illustrate schematically a card-bending test used in Reference Example 3.
Figure 14B:
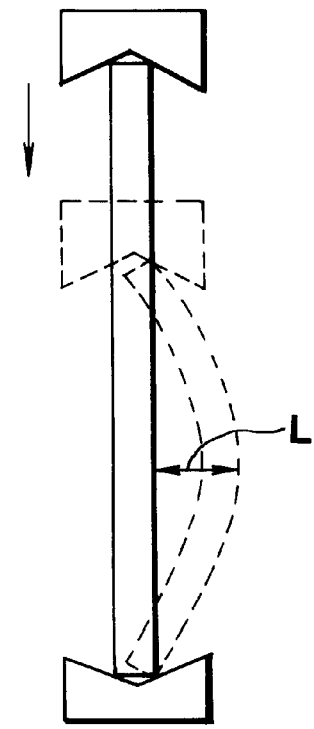

Referring now to FIG. 14, one of the short sides of the optical card was held as shown in FIG. 14 and the optical card was bent so that it becomes 20 mm one hundred times. After that, the first and the second visible information layers 711A,B and 715 of the optical card were observed visually, then a partial detachment in the second layer 711B of the first visible information layer was recognized. Further in the second layer 711A which was not detached, cracking occurred.

A delamination test as set out in the ISO/IEC 10373 5.7 was performed. As a result of this, the second layer 711B was detached by cohesion destruction.

When the same bending test and delamination test were performed on the optical card of Example 1, no detachment or cracking of the first and the second visible information layer was seen.

EXAMPLE 2

This example is in accordance with the second embodiment of the invention, and includes a structure in which a low reflective printed layer was used as the surface 801 of the first layer 711A (FIG. 8).

A transparent substrate 703 carrying a optical recording layer 701 was formed in the same way as the Example 1. A polymethylmethacylate substrate of thickness 0.3 mm, size was 54 mm×85 mm was prepared as a protective layer 709. On the protective layer 709, multi printing was performed to form the first visible information layers 711A, 711B. A black ink (trade name: SERICOL 13,911-A (Teikoku Printing Inks Mfg. Co. Ltd)) which was made of a mixture of 20 wt % carbon black and resin solution containing acrylate resin which provides a mat surface printed layer (trade name: CAV MEIVAN MEDIM (Seiko Advance Inc)) was prepared. A white ink made of a mixture of 25 wt % titanium oxide particle having 1 μm average particle size and resin solution containing polyester resin (trade name: SERICOL EGS MEDIUM (Teikoku Printing Inks Mfg. Co. Ltd)) was prepared. The black ink was screen printed on one region of the surface of the protective layer 709, the region being overlaid by the optical recording region of the optical recording layer 701, when the protective layer 709 is bonded with the transparent substrate 703 to form the first layer 711A of a thickness 3 μm which constituted the foreground of the first visible information. The surface reflectivity of the first layer 711A to infrared region light was 5% or less. Then, the white ink was screen printed on the side of the protective layer 709 where the first layer 711A was not formed, to form the second layer 711B of thickness 4 μm which constituted the background of the first visible information.

The transparent substrate 703 with the optical recording layer 701 and the transparent protective layer 709 carrying the first and the second visible information were bonded using a hot-melt type dry film (trade name: HIRODINE 7500, Exp80 (Hirodine Kogyo Co. Ltd)) in order to oppose each other at opposite sides of the optical recording layer 701 and the first visible information layer 711A.

Finally a hard coat material (trade name: UNIDIC 17-824-9 (Dainippon Ink and Chemicals Co.)) which included light setting type acrylate resin prepolymer was spin coated on the surface of the transparent substrate 703 not opposed to the optical recording layer 701. The hard coat material was cured by UV light to form a hard coat layer 705, to obtain an optical card as shown in FIG. 9.

When the optical card was observed from the radiation beam incident side, black characters over the blue background were recognisable within the optical recording region as the first visible information. The C/N ratio on the optical card was measured in the same way as in Example 1. As the result, a good C/N ratio of 58 dB was obtained.

EXAMPLE 3

This example is of a structure in which the second visible information layer 715 was formed on the optical card of the Example 2.

The second visible information layer 715 which was composed of a black printed layer, a dark blue printed layer and a red printed layer was formed on the second layer 711B of the first visible information layer of the optical card of Example 2 in the same way as the second visible information layer 715, of the Example 1. A transparent resin (trade name: SS=25 MEDIUM (Toyo Ink Mfg. Co. Ltd) was screen printed twice on the second information layer 715 to form the transparent overcoat layer 717.

When the optical card was viewed from the radiation beam incident side, black characters over the blue background were recognisable within the optical recording region as the first visible information. When the optical card was seen from the protective layer 709 side, a visible picture composed of black printed layer, dark blue printed layer and red printed layer was recognisable. When the optical card was observed under the C light source, there was some interference between the first visible information and the second visible information. This interference was prevented by providing an opaque layer 713 between the second layer 711B of the first visible information layer, and the second visible information layer 715 as in Example 1.

EXAMPLE 4

This example is in accordance with the second embodiment of the invention, and is a structure in which a reflection preventing layer 801 is provided on the first layer 711A in order to reduce reflection as shown in FIG. 8.

A transparent substrate 703 carrying an optical recording layer 701 was formed in the same way as the Example 1. A polymethylmethacylate substrate of thickness 0.3 mm, size was 54 mm×85 mm was prepared as a protective layer 709. On the protective layer 709, multi layer printing was performed to form the first visible information layer 711A, 711B as follows. Firstly, a black ink made of a mixture of 25 wt % carbon black and resin solution containing polyester resin (trade name: SERICOL EGS MEDIUM (Teikoku Printing Inks Mfg. Co. Ltd)) was prepared. A white ink made of a mixture of 25 wt % titanium oxide particle having lam average particle size and resin solution containing polyester resin (trade name: Sericol EGS MEDIUM (Teikoku Printing Inks Mfg. Co. Ltd))was prepared. The black ink was screen printed on the region of the surface of the protective layer 709 region to be overlaid by the optical recording region when the protective layer 709 of the optical recording layer 701 is bonded with the transparent substrate 703, to form the first layer 711A of a thickness of 3 μm, this constituting the foreground of the first visible information.

A transparent acrylate resin (Asahipen Corp.) was screen printed on the surface of the first layer 711A to form the reflection preventing layer 801. Then, the white ink was screen printed on one side of the protective layer 709 where the first layer 711A was not formed on to form the second layer 711B of a thickness of 4 μm to constitute the background of the first visible information.

A transparent vinyl chloride sheet of thickness 30 μm was provided on the surface of the second layer 711B by hot pressing to form the transparent overcoat layer 717 to provide a protective layer attached to the first visible information layers 711A,B.

Next, the transparent substrate 703 carrying the optical recording layer 701 and the transparent protective layer 700 carrying the first visible information layer 711A, 711B were bonded using a hot-melt type dry film (trade name: HIRODINE 7500, Exp80 (Hirodine Kogyo Co. Ltd)) so as to oppose each other on the surfaces of the optical recording layer 701 and the first visible information layers 711A, 711B.

Finally a hard coat material (trade name: UNIDIC 17-824-9 (Dainippon Ink and Chemical Inc)) which included light setting type acrylate resin prepolymer was spin coated on the surface of the transparent substrate 703, not opposed to the optical recording layer 701. The hard coat material was cured by UV light to form the hard coat layer 705.

When the optical card was seen from the radiation beam incident side, black characters over the blue background was recognisable within the optical recording region as the first visible information. The C/N ratio on the optical card was measured, and a good C/N ratio of 58 dB was obtained.

REFERENCE EXAMPLE 4

In this reference example an optical card was prepared in the same way as in Example 2, except that the second layer 711B was provided between the first layer 711A and the protective layer, and the reflectivity of the first visible information layers 711A,B was not reduced.

A PMMA substrate as used in Example 2 was prepared as a protective layer 709. A black ink which was made of a mixture of 20 wt % carbon black and resin solution containing polyester resin (trade name: SERICOL EGS MEDIUM (Teikoku Printing Inks Mfg. Co. Ltd)) was prepared. A white ink which was the same as the white ink used in Example 2 was prepared. The white ink was screen printed over one surface of the protective layer 709 to form the second layer 711B having a thickness of 4 μm to constitute the background of the first visible information. The black ink was screen printed to a thickness of 3 μm to form the first layer 711A on the region of the second layer 711B to be overlaid by the optical recording region of the recording layer 701 when the second layer 711B was bonded with the transparent substrate 703, to form the first layer 711A to the protective layer 709 carrying the background layer 711B of the first visible information.

The surface reflectivity of the first layer 711A for infrared region light was almost 10%. The surface reflectivity of the second layer 711B for infrared region light was over 10%.

The C/N ratio of the optical card was performed and found to be 53 dB, i.e. a reduction of that for Example 2. The reason for this was thought to be as follows: The white printed layer of the second layer 711B of the first visible information layer was formed on the side of the protective layer 709, opposed to the optical recording layer 701. As the surface reflectivities of the first layer 711A and the second layer 711B were high, reflection of the reproducing radiation beam occurred.

EXAMPLE 5

This example is a structure in accordance with the third embodiment described above in which a reflection preventing layer was formed on the first layers 711A,B of Reference Example 4 as shown in FIG. 9.

A protective layer 709 carrying the first visible information layers 711A, 711B was provided in the same way as the Reference Example 4. A transparent acrylate resin (Asahipen Corp.) was screen printed on the surface of the first layer 711A and the second layer 711B to form a reflection preventing layer 80. An optical card was formed using the protective layer 709 carrying the first visible information layers 711A, B of which the surface 801 had a reduced reflectivity.

A C/N measurement on the optical card was performed, and found to be almost 58 dB.

EXAMPLE 6

Figure 11B:
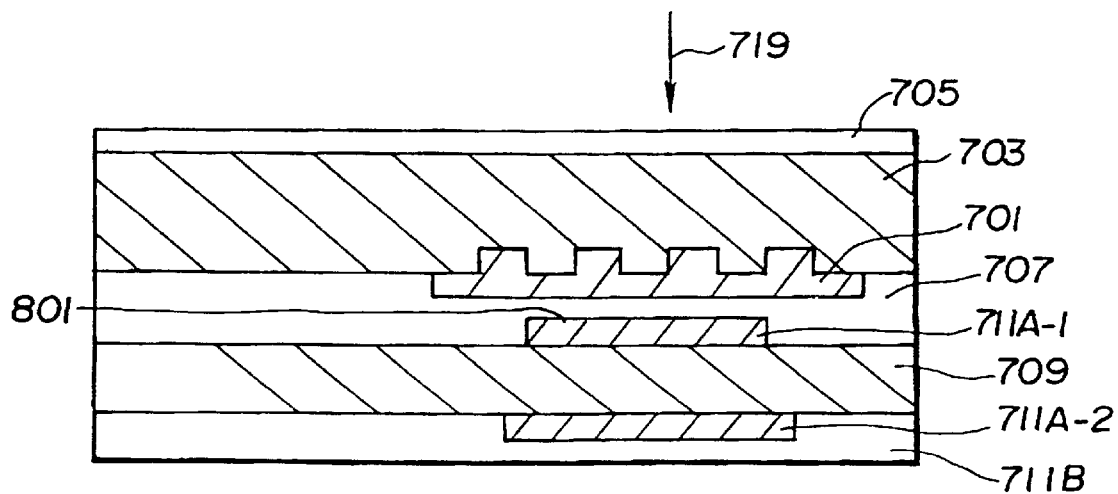
FIG. 11(b) is a schematic cross sectional view taken on line I—I of FIG. 10(a)

This example is in accordance with the fourth embodiment described above, in which the first layer 711A of the first visible information layer comprises layers formed separately on the inside and outside of the protective layer 709 as shown in FIG. 11.

A optical card was prepared in the same way as in Example 2, except that the first visible information layer was formed in a following way.

The black ink and the white ink used in Example 2 were prepared. The black ink was screen printed on the region of the surface of the protective layer 709 to be overlaid by the optical recording region of the recording layer 701 when the protective layer 709 is bonded with the transparent substrate 703, to form the first sublayer of the first layer 711A-1 of a thickness of 3 μm constituting the foreground of the first visible information.

Then, the black ink was screen printed the surface of the protective layer 709 where the first layer 711A-1 was not formed in a position so as to be overlaid by the first layer 711A-1, to form the second sublayer of the first layer 711A-2 of a thickness 3 μm, this constituting part of the foreground of the first visible information.

The white ink was screen printed on the first layer 711A-2 of the protective layer 709 to cover the second layer 711A-2 to form a layer having a thickness of 4 μm to constitute the background of the first visible information. Therefore the protective layer 709 carrying the first visible information layers 711A-1, 711A-2; 711B was produced.

When the optical card was viewed from the radiation beam incident side, three-dimensional black visible information over the blue background was recognised within the optical recording region.

EXAMPLE 7

This example is in accordance with the Fourth embodiment of the invention described above in which the first layer of the first visible information layer 711A comprises multilayers 711A-1. 711A-2, these multilayers being formed separately on the inside and outside of the protective layer 709.

An optical card was prepared in the same way as the Example 4, except that the protective layer 709 having the first visible information layer formed in a following way was used. The black ink and white ink used in the Example 4 were prepared together with a yellow ink which was made of a mixture of 30 wt % Fast Yellow-G as a yellow pigment and resin solution containing polyester resin (trade name: SERICOL EGS MEDIUM (Teikoku Printing Inks Mfg. Ltd)). The black ink was screen printed on the region of the surface of the protective layer 709, to be overlaid by the optical recording region 701 when the protective layer 709 is bonded with the transparent substrate 703, to form the first layer 711A-1 of thickness 3 μm constituting the foreground of the first visible information. A reflection prevention layer 801 was formed on the surface of the first layer 711A-1 in the same way as in Example 4.

The white ink was then screen printed on the surface of the protective layer 709 not carrying the first layer 711-A in order to be overlaid by the first layer 711A-1 to form the second sublayer of the first layer 711A-2 of a thickness 3 μm. The yellow ink was screen printed on the second sublayer of the first layer 711A-2 of the protective layer to cover the second sublayer 711A-2 to form the second layer 711B of a thickness 4 μm to constitute the background of the first visible information. The surface reflectivity of the yellow ink printed layer for infrared region light was 30% or less. A transparent resin (trade name: SS-25 MEDIUM (Toyo Ink Mfg. Co. Ltd)) was screen printed twice on the second information layer 711-B to form overcoat layer 717. An optical card was formed using the protective layer carrying the first visible information.

When the optical card was observed from the radiation beam incident side, three-dimensional visible information composed of black and blue over the green background was recognized within the optical recording region.

EXAMPLE 8

In this example in accordance with an embodiment of the invention, a second visible information layer 715 was provided on the optical card of Example 6.

The second visible information layer 715 which was composed of a black printed layer, dark blue printed layer and a red printed layer was formed on the second layer 711-B of the first visible information layers of the optical card of Example 6 in the same way as the second visible information layer 715 of Example 1. A transparent resin (trade name: SS-25 medium (Toyo Ink Mfg. Co. Ltd)) was screen printed twice on the second information layer 715 to form an overcoat layer 717.

When the optical card was observed from the radiation beam incident side, three-dimensional black characters over the blue background were recognisable within the optical recording region as the first visible information.

When the optical card was seen from the protective layer side 709, a visible picture composed of black printed layer, dark blue printed layer and red printed layer was recognisable.

When the optical card was observed under the C light source, there was some interference between the first visible information and the second visible information. This interference between the first visible information and the second visible information could be prevented by providing a opaque layer between the second layer 711B of the first visible information layer, and the second visible information layer 715 in the same manner as that in Example 1.

It will be appreciated that whilst in the embodiments of the invention described herebefore, the first and second information layers are visible information layers, which are readable by the eyes of an observer under the visible light, the invention is also applicable to information which is read by radiation within other wavebands, as long as the other wavebands are different to that of the radiation used to read the optical recording layer.

What I claim is:

1. An optical recording medium comprising:
   an optical recording layer readable by radiation within a first wavelength band; and
   a first visible information region carrying first information, and
   a second visible information region carrying second information,
   said first and second regions being readable by radiation within a second wavelength band different from said first wavelength band,
   the first visible information region being overlaid by the optical recording layer,
   the optical recording layer having a transmissivity for radiation within said second wavelength band so that the first information is readable through the optical recording layer by radiation within said second wavelength band,
   wherein the medium includes,
   a layer opaque to radiation within said second wavelength band provided between the first visible information region and the second visible information region.

2. An optical recording medium comprising:
   an optical recording layer readable by radiation within a first wavelength band;
   a first visible information region carrying first information readable by radiation within a second wavelength band different from said first wavelength band, the first visible information region being overlaid by the optical recording layer,
   the optical recording layer having a transmissivity for radiation within said second wavelength band so that the first information is readable through the optical recording layer,
   wherein the surface of the first visible information region which opposes the optical recording layer is arranged to have a low reflectivity for radiation within said first wavelength band.

3. An optical recording medium according to claim 2, including a second visible information region carrying second information readable by radiation within said second wavelength band, a layer opaque to radiation within said second radiation band being interposed between the first and second visible information regions.

4. The optical recording medium according to claim 1 or 2, wherein the first visible information region comprises a plurality of layers.

5. The optical recording medium according to claim 4, in which said plurality of layers comprises a first layer constituting a foreground for the first information, and a second layer constituting a background for the first information.

6. The optical recording medium according to claim 4, in which said plurality of layers comprises at least two layers, each on a different plane in the medium and each carrying visible information, the visible information in the two layers being sufficiently similar in appearance and being so aligned that, when viewed through the optical recording layer, said visible information has a three-dimensional appearance.

7. The optical recording medium according to claim 5, wherein the first layer constituting a foreground for the first information comprises a first foreground sublayer and a second foreground sublayer, each on a different plane in the medium and each carrying visible information, the visible information in the two foreground sublayers being sufficiently similar in appearance and being so aligned that, when viewed through the optical recording layer, said visible information has a three-dimensional appearance.

8. The optical recording medium according to claim 1 or 2, wherein the medium comprises a substrate and a protective layer between which the recording layer is interposed, where the substrate is at least partially transmissive to radiation within said first and second wavelength bands.

9. The optical recording medium according to claim 8, wherein one of the surfaces of the optical recording layer is in contact with a surface of the substrate.

10. The optical recording medium according to claim 8, wherein an adhesive layer is provided between the recording layer and the protective layer.

11. The optical recording medium according to claim 8, wherein said first visible information region comprises a first layer constituting a foreground for the first information, and a second layer constituting a background for the first information, and wherein the first and second layers are provided on the surface of the protective layer remote from the recording layer such that the first information opposes the recording layer.

12. The optical recording medium according to claim 8, wherein said first visible information region comprises a first layer constituting a foreground for the first information, and a second layer constituting a background for the first information, and wherein the first layer is provided between the recording layer and the protective layer, and the second layer is provided on the surface of the protective layer remote from the recording layer.

13. The optical recording medium according to claim 8, wherein said first visible information region comprises a first layer constituting a foreground for the first information, and a second layer constituting a background for the first information, and wherein the first and second layers are provided between the recording layer and the protective layer.

14. The optical recording medium according to claim 12, wherein the surface of the second layer, provided at the surface of the protective layer remote from the recording layer and opposing the recording layer has a reflectivity of not greater than 30% for radiation in said first wavelength band.

15. The optical recording medium according to claim 14, wherein the surface has a reflectivity of not greater than 20% for radiation in said first wavelength band.

16. The optical recording medium according to claim 15, wherein the surface has a reflectivity of not greater than 10% for radiation in said first wavelength band.

17. The optical recording medium according to claim 12, wherein the surface of the first layer provided between the recording layer and the protective layer, and opposing the recording layer has a reflectivity of not greater than 5% for radiation in said first wavelength band.

18. The optical recording medium according to claim 8, wherein said first visible information region comprises a first layer and a second layer, each on a different plane in the medium and each carrying visible information, the visible information in the two layers being sufficiently similar in appearance and being so aligned that, when viewed through the optical recording layer, said visible information has a three-dimensional appearance, and wherein the first layer is provided between the recording layer and the protective layer, and the second layer is provided at the surface of the protective layer remote from the recording layer.

19. The optical recording medium according to claim 8, wherein said first visible information region comprises a first layer constituting a foreground for the first information and a second layer constituting a background for the first information, and the first layer comprises a first foreground sublayer and a second foreground sublayer, each on a different plane in the medium and each carrying visible information, the visible information in the two foreground sublayers being sufficiently similar in appearance and being so aligned that, when viewed through the optical recording layer, said visible information has a three-dimensional appearance, and wherein the first foreground sublayer is provided between the recording layer and the protective layer, and the second foreground sublayer is provided at the surface of the protective layer remote from the recording layer.

20. The optical recording medium according to claim 12, wherein the surface of the first layer is covered with a reflection preventing layer.

21. The optical recording medium according to claim 12, wherein the surface of the first layer opposing the recording layer has a mat surface.

22. The optical recording medium according to claim 12, wherein the surface of the first layer opposing the recording layer is designed to absorb radiation within said first wavelength band.

23. The optical recording the medium according to claim 11, wherein at least one of the first and second layers comprises a printed layer.

24. An optical recording medium according to claim 23, wherein the printed layer includes at least one of a dye, a pigment, and a resin.

25. An optical recording medium according to claim 24, wherein the content of the dye, the pigment or the dye and the pigment in the printed layer is 30 wt % to 70 wt %.

26. An optical recording medium according to claim 23, wherein the thickness of the printed layer is 1 to 20 microns.

27. An optical recording medium according to claim 26, wherein the thickness of the printed layer is 1 to 7 microns.

28. The optical recording medium according to claim 14, wherein the surface of the second layer opposing the recording layer is a printed layer of a white ink.

29. The optical recording medium according to claim 28, wherein the printed layer includes titanium oxide of 30–70 wt %.

30. The optical recording medium according to claim 1 or 3, wherein the opaque layer comprises a plurality of sublayers.

31. The optical recording medium according to claim 1 or 3, wherein the thickness of the opaque layer is 3 to 30 microns.

32. The optical recording medium according to claim 1 or 3, wherein the transmissivity of the opaque layer in said second wavelength band is not greater than 10%.

33. An optical recording medium according to claim 1 or 3, wherein the opaque layer comprises a printed layer.

34. An optical recording medium according to claim 1 or 3, wherein the opaque layer includes particles chosen from metal particles and metal oxide particles.

35. An optical recording medium according to claim 34, wherein the average particle size of the particles is between 0.1 and 3 microns.

36. An optical recording medium according to claim 34, wherein the metal is aluminium.

37. An optical recording medium according to claim 34, wherein the metal oxide is aluminium oxide.

38. An optical recording medium according to claim 34, wherein the opaque layer includes particles of 30 wt % to 70 wt %.

39. An optical recording medium according to claim 38, wherein the opaque layer includes particles of 30 wt % to 60 wt %.

40. An optical recording medium according to claim 1 or 3, wherein the opaque layer includes a resin.

41. An optical recording medium according to claim 40, wherein the resin includes a choice from polyester resin or vinyl chloride resin.

42. The optical recording medium according to claim 1 or 2, wherein the optical recording layer includes an organic dye.

43. The optical recording medium according to claim 42, wherein the organic dye is polymethine dye.

44. An optical recording medium according to claim 1 or 2, in which said second wavelength band comprises the visible light region.

45. The optical recording medium according to claim 1 or 2, in which said first wavelength band comprises the infrared wavelength region.

46. The optical recording medium according to claim 13, wherein the respective surfaces of the first and the second layers provided between the recording layer and the protective layer that oppose the recording layer each have a reflectivity of not greater than 5% for radiation in said first wavelength band.

47. The optical recording medium according to claim 11, wherein the surfaces of the first and second information layers provided at the surface of the protective layer remote from the recording layer and opposing the recording layer each have a reflectivity of not greater than 30% for radiation in said first wavelength band.

48. The optical recording medium according to claim 47, wherein said surfaces of the first and second information layers each have a reflectivity of not greater than 20% for radiation in said first wavelength band.

49. The optical recording medium according to claim 48, wherein said surfaces of the first and second information layers each have a reflectivity of not greater than 10% for radiation in said first wavelength band.

50. The optical recording medium according to claim 47, wherein the surface of at least one of the first and second layers opposing the recording layer is a printed layer of a white ink.

51. The optical recording medium according to claim 50, wherein the printed layer includes titanium oxide of 30–70 wt %.

52. The optical recording medium according to claim 13, wherein the respective surfaces of the first and the second layers are covered with reflection preventing layer.

* * * * *